(12) United States Patent
Tsukagoshi et al.

(10) Patent No.: US 11,967,915 B2
(45) Date of Patent: Apr. 23, 2024

(54) MOTOR CONTROL DEVICE, MOTOR CONTROL METHOD, HYBRID SYSTEM, BOOST CONVERTER SYSTEM AND ELECTRIC POWER STEERING SYSTEM

(71) Applicant: Hitachi Astemo, Ltd., Hitachinaka (JP)

(72) Inventors: Takaya Tsukagoshi, Tokyo (JP); Takafumi Hara, Tokyo (JP); Katsuhiro Hoshino, Hitachinaka (JP); Toshiyuki Ajima, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 161 days.

(21) Appl. No.: 17/778,544

(22) PCT Filed: Nov. 4, 2020

(86) PCT No.: PCT/JP2020/041139
§ 371 (c)(1),
(2) Date: May 20, 2022

(87) PCT Pub. No.: WO2021/100456
PCT Pub. Date: May 27, 2021

(65) Prior Publication Data
US 2023/0008549 A1 Jan. 12, 2023

(30) Foreign Application Priority Data
Nov. 22, 2019 (JP) .................................. 2019-211272

(51) Int. Cl.
*H02P 27/08* (2006.01)
*B62D 5/04* (2006.01)
(Continued)

(52) U.S. Cl.
CPC .............. *H02P 27/08* (2013.01); *B62D 5/046* (2013.01); *H02M 1/12* (2013.01); *H02M 7/5395* (2013.01); *H02P 6/10* (2013.01); *H02P 21/18* (2016.02)

(58) Field of Classification Search
CPC . H02P 27/08; H02P 21/18; H02P 6/10; B62D 5/046; H02M 1/12; H02M 7/5395
See application file for complete search history.

(56) References Cited

U.S. PATENT DOCUMENTS

2016/0308459 A1* 10/2016 Fujii ....................... H02M 1/12
2018/0337623 A1* 11/2018 Ota ....................... H02M 7/5395
(Continued)

FOREIGN PATENT DOCUMENTS

JP 2009-291019 A 12/2009
JP 2012-235619 A 11/2012
(Continued)

OTHER PUBLICATIONS

International Search Report (PCT/ISA/210) issued in PCT Application No. PCT/JP2020/041139 dated Jan. 19, 2021 with English translation (four (4) pages).
(Continued)

*Primary Examiner* — Zoheb S Imtiaz
(74) *Attorney, Agent, or Firm* — Crowell & Moring LLP

(57) ABSTRACT

The vibration and noise generated in a permanent magnet synchronous motor are effectively suppressed. A motor control device 1 comprises: a triangular wave generation unit 17 which generates a triangular wave signal Tr that is a carrier wave, a carrier frequency adjustment unit 16 which adjusts a carrier frequency fc that represents a frequency of the triangular wave signal Tr, and a gate signal generation unit 18 which performs pulse-width modulation on three-phase voltage commands Vu*, Vv*, Vw* according to a
(Continued)

torque command T* using the triangular wave signal Tr, thereby generating a gate signal for controlling an operation of an inverter. The carrier frequency adjustment unit 16 adjusts the carrier frequency fc so as to change a voltage phase error $\Delta\theta v$ representing a phase difference of the three-phase voltage commands Vu*, Vv*, Vw* and the triangular wave signal Tr based on the torque command T*, and a rotation speed $\omega r$ of a motor.

15 Claims, 15 Drawing Sheets

(51) Int. Cl.
*H02M 1/12* (2006.01)
*H02M 7/5395* (2006.01)
*H02P 6/10* (2006.01)
*H02P 21/18* (2016.01)

(56) References Cited

U.S. PATENT DOCUMENTS

2020/0119678 A1 4/2020 Hoshino et al.
2022/0294377 A1* 9/2022 Takahashi ............... H02P 21/18

FOREIGN PATENT DOCUMENTS

JP 2018-99003 A 6/2018
WO WO 2018/139295 A1 8/2018

OTHER PUBLICATIONS

Japanese-language Written Opinion (PCT/ISA/237) issued in PCT Application No. PCT/JP2020/041139 dated Jan. 19, 2021 (three (3) pages).

* cited by examiner

MOTOR CONTROL DEVICE, MOTOR CONTROL METHOD, HYBRID SYSTEM, BOOST CONVERTER SYSTEM AND ELECTRIC POWER STEERING SYSTEM

TECHNICAL FIELD

The present invention relates to a motor control device, a motor control method, a hybrid system, a boost converter system and an electric power steering system.

BACKGROUND ART

A permanent magnet synchronous motor is widely prevalent for use in the driving and generation of electric vehicles since it does not require a mechanical current commutation mechanism such as a brush or a commutator, and is easy to maintain, is small and light, and has a high efficiency and a high power factor. Generally speaking, a permanent magnet synchronous motor comprises a stator configured from an armature coil and the like, and a rotor configured from a permanent magnet, an iron core and the like. An armature magnetic flux is generated by converting a DC voltage, which is supplied from a DC power source such as a battery, into an AC voltage with an inverter, and causing an alternating current to flow to the armature coil of the permanent magnet synchronous motor. The permanent magnet synchronous motor is driven by a magnet torque generated by the suction force or repulsive force arising between the armature magnetic flux and a magnetic flux of the permanent magnet, and a reluctance torque generated in order to minimize the magnetic resistance of the armature magnetic flux that passes through the rotor.

Electromagnetic forces based on the armature magnetic flux and the magnet magnetic flux are respectively generated in a rotational direction (circumferential direction) of the motor and a direction that is perpendicular to the axis of rotation of the motor (radial direction) of the permanent magnet synchronous motor. The foregoing torque is obtained by integrating the electromagnetic force in the circumferential direction, and this includes the fluctuation of the torque (torque pulsation) caused by the structure of the magnetic circuit of the motor. Meanwhile, the electromagnetic force generated in the radial direction of the motor acts as an excitation force (electromagnetic excitation force) which causes the stator or case of the motor to become deformed or vibrate.

During the low rotation of a motor, since there are not many other vibration and noise factors, the vibration and noise caused by the torque pulsation become notable. In particular, with an environmentally compatible vehicle such as an electric vehicle or a hybrid vehicle that uses a permanent magnet synchronous motor, there are cases where vehicle body resonance is generated based on a two-inertia system of the motor rotor and the tires during low rotation, and the vibration and noise become notable. Meanwhile, in the rotating speed range of the motor during times other than during low rotation, the electromagnetic force in the radial direction (electromagnetic excitation force) becomes roughly 5 to 10 times greater in comparison to the electromagnetic force in the circumferential direction (torque pulsation). Thus, the vibration and noise caused by the electromagnetic excitation force become dominant.

In addition, an alternating current flowing to the motor is used for controlling the drive of the motor, and includes a fundamental current component such as a sine wave in which the frequency is converted according to the rotating speed of the motor, and a harmonic current component caused by a switching operation of the inverter. The frequency of the harmonic current is decided based on the frequency of the fundamental current and the frequency of the carrier wave for use in PWM modulation. Thus, depending on the rotating speed of the motor, there are cases where the electromagnetic excitation force or the torque pulsation generated by the motor based on a fundamental current and the electromagnetic excitation force or the torque pulsation generated by the motor based on the harmonic current overlap, and significant vibration and noise are consequently generated.

As the technology related to the present invention, the technology described in PTL 1 is known. PTL 1 discloses a method of including a fundamental current according to rotating speed of a permanent magnet motor and a harmonic current based on a switching operation and controlling a second phase so that a first phase which is a phase of an excitation force that is periodically generated in the motor based on the fundamental current and the second phase which is a phase of an excitation force that is periodically generated in the motor based on the harmonic current do not overlap with each other at a predetermined motor rotating speed.

CITATION LIST

Patent Literature

PTL 1: International Publication No. 2018/139295

SUMMARY OF THE INVENTION

Problems to be Solved by the Invention

As described above, during the low rotation of a motor, since there are not many other vibration and noise factors, the vibration and noise caused by the torque pulsation become notable. Meanwhile, in the rotating speed range of the motor during times other than during low rotation, the vibration and noise caused by the electromagnetic excitation force become dominant. As described above, with an environmentally compatible vehicle such as an electric vehicle or a hybrid vehicles that uses a permanent magnet synchronous motor, the vibration and noise at rotating speeds of a broad range become a problem. Nevertheless, with the method disclosed in PTL 1, it is not possible to effectively improve the foregoing points at rotating speeds of a broad range.

The present invention was devised in view of the foregoing problems, and an object of this invention is to effectively control the vibration and noise generated in a permanent magnet synchronous motor.

Means to Solve the Problems

A motor control device according to the present invention, which controls a drive of an AC motor that is connected to a power converter which converts power from DC power to AC power, and driven with the AC power, comprises: a carrier wave generation unit which generates a carrier wave; a carrier frequency adjustment unit which adjusts a frequency of the carrier wave; and a gate signal generation unit which performs pulse-width modulation on a voltage command according to a torque command using the carrier wave, thereby generating a gate signal for controlling an operation of the power converter, wherein the carrier frequency adjustment unit adjusts the frequency of the carrier wave so as to change a phase difference of the voltage command and the carrier wave based on the torque command and a rotation speed of the AC motor.

A motor control method according to the present invention for controlling a drive of an AC motor that is connected to a power converter which converts power from DC power to AC power, and driven with the AC power, comprises: adjusting a frequency of a carrier wave so as to change a phase difference of a voltage command according to a torque command and the carrier wave based on the torque command to the AC motor and a rotation speed of the AC motor; generating the carrier wave at the adjusted frequency; and performing pulse-width modulation on the voltage command using the carrier wave, thereby generating a gate signal for controlling an operation of the power converter.

A hybrid system according to the present invention comprises: the motor control device; a power converter which is operated based on the gate signal output from the motor control device, and which converts power from DC power to AC power; an AC motor which is driven with the AC power; and an engine system which is connected to the AC motor.

A boost converter system according to the present invention comprises: the motor control device; a boost converter which is connected to a DC power source and generates DC power obtained by boosting the DC power source according to a control of the motor control device; and a power converter which is operated based on the gate signal output from the motor control device, and which performs power conversion from the DC power boosted with the boost converter to AC power.

An electric power steering system according to the present invention comprises: the motor control device; a plurality of power converters which are respectively operated based on the gate signal output from the motor control device, and which respectively perform power conversion from DC power to AC power; and an AC motor which includes a plurality of winding systems, and which is driven by the AC power generated by each of the plurality of power converters flowing to each of the plurality of winding systems, wherein the electric power steering system controls steering of a vehicle using the AC motor.

Advantageous Effects of the Invention

According to the present invention, the vibration and noise generated in a permanent magnet synchronous motor can be effectively suppressed.

DESCRIPTION OF EMBODIMENTS

An embodiment of the present invention is now explained in detail with reference to the appended drawings. This embodiment explains an example of applying the present invention to a motor drive system that is used by being mounted on an electric vehicle or a hybrid vehicle.

First Embodiment

Figure 1:
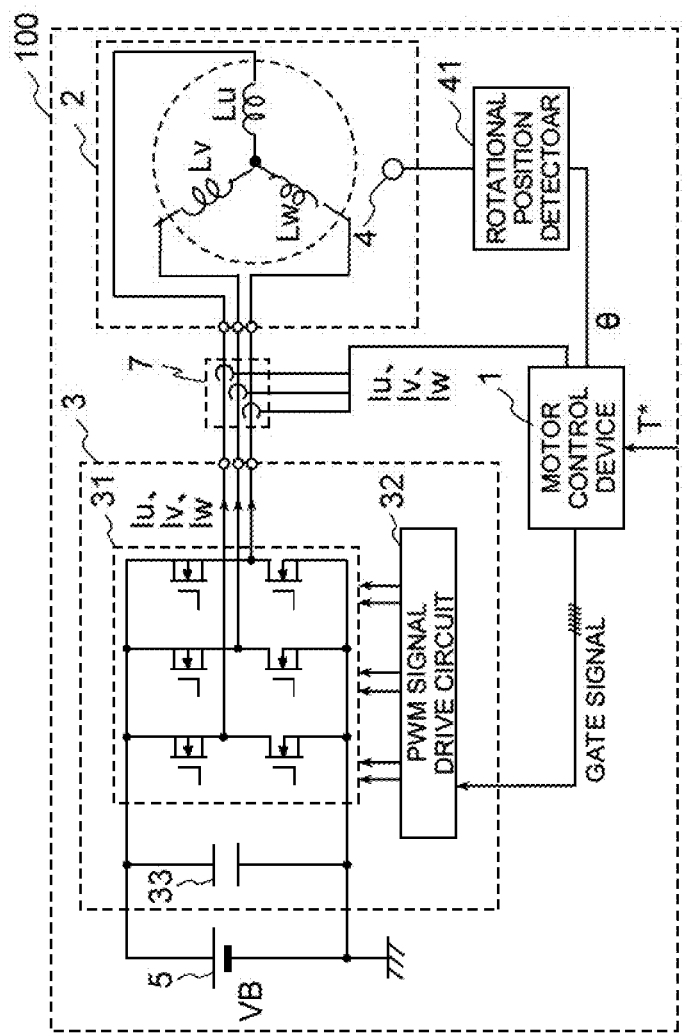
FIG. 1 is an overall configuration diagram of a motor drive system comprising the motor control device according to an embodiment of the present invention.

FIG. 1 is an overall configuration diagram of a motor drive system comprising the motor control device according to an embodiment of the present invention. In FIG. 1, the motor drive system 100 comprises a motor control device 1, a permanent magnet synchronous motor (hereinafter simply referred to as the "motor") 2, an inverter 3, a rotational position detector 41, and a high-voltage battery 5.

The motor control device 1 generates a gate signal for controlling a drive of the motor 2 based on a torque command T* according to the target torque requested by the vehicle to the motor 2, and outputs the generated gate signal to the inverter 3. Note that the details of the motor control device 1 will be explained later.

The inverter 3 includes an inverter circuit 31, a PWM signal drive circuit 32 and a smoothing capacitor 33. The PWM signal drive circuit 32 generates a PWM signal for controlling each switching device equipped in the inverter circuit 31 based on the gate signal input from the motor control device 1, and outputs the generated PWM signal to the inverter circuit 31. The inverter circuit 31 includes switching devices each corresponding to an upper arm and a lower arm of a U phase, a V phase, and a W phase. By controlling each of these switching devices according to the PWM signal input from the PWM signal drive circuit 32, DC power supplied from the high-voltage battery 5 is converted into AC power, and output to the motor 2. The smoothing capacitor 33 smoothes the DC power supplied from the high-voltage battery 5 to the inverter circuit 31.

The motor 2 is a synchronous motor that is rotatably driven by the AC power supplied from the inverter 3, and includes a stator and a rotor. When the AC power input from the inverter 3 is applied to armature coils Lu, Lv, Lw provided to the stator, three-phase alternating currents Iu, Iv, Iw become conducted in the motor 2, and an armature magnetic flux is generated in each armature coil. As a result of suction force or repulsive force being generated between the armature magnetic flux of each armature coil and the magnet magnetic flux of the permanent magnet mounted on the rotor, torque is generated in the rotor, and the rotor is rotatably driven.

The motor 2 is equipped with a rotational position sensor 4 for detecting a rotational position θ of the rotor. The rotational position detector 41 operates the rotational position θ from an input signal of the rotational position sensor 4. The operation result of the rotational position θ by the rotational position detector 41 is input to the motor control device 1, and used in the phase control of the AC power that is performed by the motor control device 1 generating a gate signal according to the phase of the induced voltage of the motor 2.

Here, while a resolver configured from an iron core and a winding wire is a more preferred example as the rotational position sensor 4, a magnetic resistive element such as a GMR sensor or a sensor using a Hall device may also be used. Moreover, rather than using the input signal from the rotational position sensor 4, the rotational position detector 41 may also estimate the rotational position θ by using the three-phase alternating currents Iu, Iv, Iw flowing to the motor 2 or the three-phase alternating voltages Vu, Vv, Vw applied from the inverter 3 to the motor 2.

A current detection means 7 is disposed between the inverter 3 and the motor 2. The current detection means 7 detects the three-phase alternating currents Iu, Iv, Iw (U phase alternating current Iu, V phase alternating current Iv and W phase alternating current Iw) that energize the motor 2. The current detection means 7 is configured, for example, using a Hall current sensor or the like. The detection results of the three-phase alternating currents Iu, Iv, Iw by the current detection means 7 are input to the motor control device 1 and used for the generation of a gate signal performed by the motor control device 1. Note that, while FIG. 1 shows an example where the current detection means 7 is configured from three current detectors, the configuration may also be such that two current detectors are used, and the alternating current of the remaining one phase may be calculated based on the fact that the sum of the three-phase alternating currents Iu, Iv, Iw is zero. Moreover, a pulsed direct current that flows from the high-voltage battery 5 to the inverter 3 may be detected with a shunt resistance or the like inserted between the smoothing capacitor 33 and the inverter 3, and the three-phase alternating currents Iu, Iv, Iw may also be obtained based on the foregoing direct current and the three-phase alternating voltages Vu, Vv, Vw applied from the inverter 3 to the motor 2.

Figure 2:
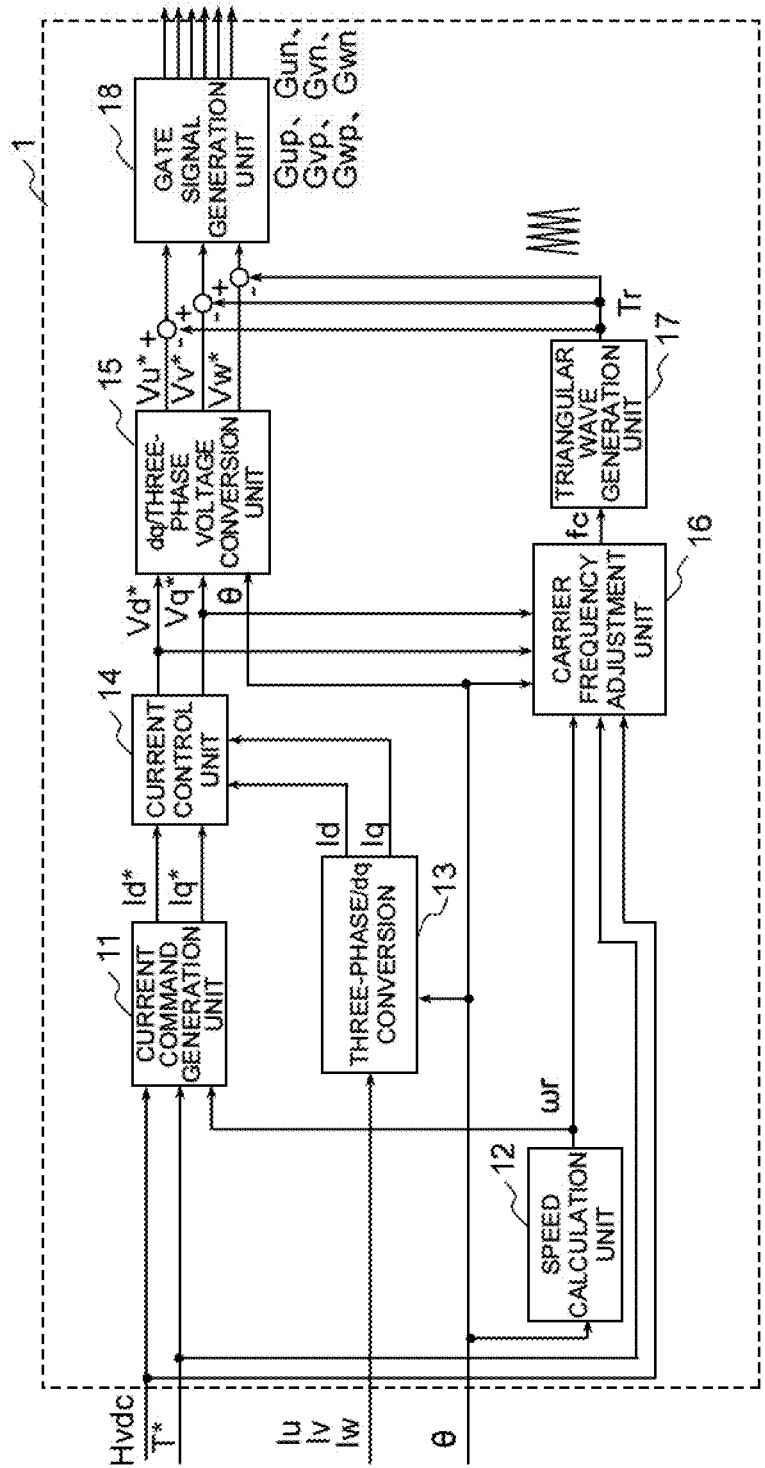
FIG. 2 is a block diagram showing a functional configuration of the motor control device according to the first embodiment of the present invention.

Details of the motor control device 1 are now explained. FIG. 2 is a block diagram showing a functional configuration of the motor control device 1 according to the first embodiment of the present invention. In FIG. 2, the motor control device 1 includes the respective functional blocks of a current command generation unit 11, a speed calculation unit 12, a three-phase/dq conversion current control unit 13, a current control unit 14, a dq/three-phase voltage command conversion unit 15, a carrier frequency adjustment unit 16, a triangular wave generation unit 17, and a gate signal generation unit 18. The motor control device 1 is configured, for example, from a microcomputer, and these functional blocks can be realized by the microcomputer executing predetermined programs. Otherwise, a part or all of these functional blocks may also be realized using hardware circuits such as a logic IC or an FPGA.

The current command generation unit 11 operates a d-axis current command Id* and a q-axis current command Iq* based on the input torque T* command and power source voltage Hvdc. Here, the d-axis current command Id* and the q-axis current command Iq* according to the torque command T* are obtained by using, for example, a pre-set current command map or mathematical formula.

The speed calculation unit 12 operates a motor rotation speed ωr representing a rotation speed (rotations per minute) of the motor 2 from a time change of the rotational position θ. Note that the motor rotation speed ωr may also be a value represented with either an angular velocity (rad/s) or rotations per minute (rpm). Moreover, these values may also be mutually converted and used.

The three-phase/dq conversion current control unit 13 operates a d-axis current value Id and a q-axis current value Iq by performing a dq conversion based on the rotational position θ obtained by the rotational position detector 41 to the three-phase alternating currents Iu, Iv, Iw detected by the current detection means 7.

The current control unit 14 operates a d-axis voltage command Vd* and a q-axis voltage command Vq* based on a deviation of the d-axis current command Id* and the q-axis current command Iq* output from the current command generation unit 11 and the d-axis current value Id and the q-axis current value Iq output from the three-phase/dq conversion current control unit 13 so that each of these values coincide. Here, for example, based on a control method such as PI control or the like, the d-axis voltage command Vd* according to the deviation of the d-axis current command Id* and the d-axis current value Id, and the q-axis voltage command Vq* according to the deviation of the q-axis current command Iq* and the q-axis current value Iq, are obtained.

The dq/three-phase voltage command conversion unit 15 operates the three-phase voltage commands Vu*, Vv*, Vw* (U phase voltage command value Vu*, V phase voltage command value Vv* and W phase voltage command value Vw*) by performing a three-phase conversion based on the rotational position θ obtained by the rotational position detector 41 to the d-axis voltage command Vd* and the q-axis voltage command Vq* operated by the current control unit 14. The three-phase voltage commands Vu*, Vv*, Vw* according to the torque command T* are thereby generated.

The carrier frequency adjustment unit 16 operates the carrier frequency fc representing the frequency of the carrier wave to be used in the generation of a gate signal based on the d-axis voltage command Vd* and the q-axis voltage command Vq* generated by the current command generation unit 11, the rotational position θ obtained by the rotational position detector 41, the rotation speed ωr obtained by the speed calculation unit 12, the torque command T*, and the power source voltage Hvdc. The frequency of the carrier wave is adjusted so as to suppress the vibration and noise generated by the motor 2 as a result of the triangular wave generation unit 17 generating the carrier wave according to the foregoing carrier frequency fc. Note that details of the operating method of the carrier frequency fc by the carrier frequency adjustment unit 16 will be described later.

The triangular wave generation unit 17 generates a triangular wave signal (carrier wave signal) Tr based on the carrier frequency fc operated by the carrier frequency adjustment unit 16.

The gate signal generation unit 18 performs pulse-width modulation on each of the three-phase voltage commands Vu*, Vv*, Vw* output from the dq/three-phase voltage command conversion unit 15 using the triangular wave signal Tr output from the triangular wave generation unit 17, and generates a gate signal for controlling the operation of the inverter 3. Specifically, a pulsed voltage is generated to each phase of the U phase, the V phase, and the W phase based on a comparison result of the three-phase voltage commands Vu*, Vv*, Vw* output from the dq/three-phase voltage command conversion unit 15 and the triangular wave signal Tr output from the triangular wave generation unit 17. Subsequently, a gate signal to the switching device of each phase of the inverter 3 is generated based on the generated pulsed voltage. Here, gate signals Gun, Gvn, Gwn of a lower arm are generated by logically inverting gate signals Gup, Gyp, Gwp of an upper arm of each phase. The gate signal generated by the gate signal generation unit 18 is output from the motor control device 1 to the PWM signal drive circuit 32 of the inverter 3, and converted into a PWM signal by the PWM signal drive circuit 32. Consequently, each switching device of the inverter circuit 31 is subject to ON/OFF control, and the output voltage of the inverter 3 is adjusted.

The operation of the carrier frequency adjustment unit 16 in the motor control device 1 is now explained. As described above, the carrier frequency adjustment unit 16 operates the carrier frequency fc based on the d-axis voltage command Vd* and the q-axis voltage command Vq*, the rotational position θ, the rotation speed ωr, the torque command T*, and the power source voltage Hvdc. The period and the phase of the triangular wave signal Tr, which is a carrier wave, are respectively adjusted to become an intended relationship relative to the voltage waveform of the three-phase voltage commands Vu*, Vv*, Vw* according to the torque command T* by sequentially controlling the frequency of the triangular wave signal Tr generated by the triangular wave generation unit 17 according to the foregoing carrier frequency fc. Note that the term "intended relationship" as used herein refers to a relationship in which the electromagnetic excitation force or the torque pulsation generated by the motor 2 based on a harmonic current caused by the switching operation of the inverter 3 based on a PWM signal become the same period and antiphase as the electromagnetic excitation force or the torque pulsation generated based on a fundamental current according to the voltage command.

Figure 3:
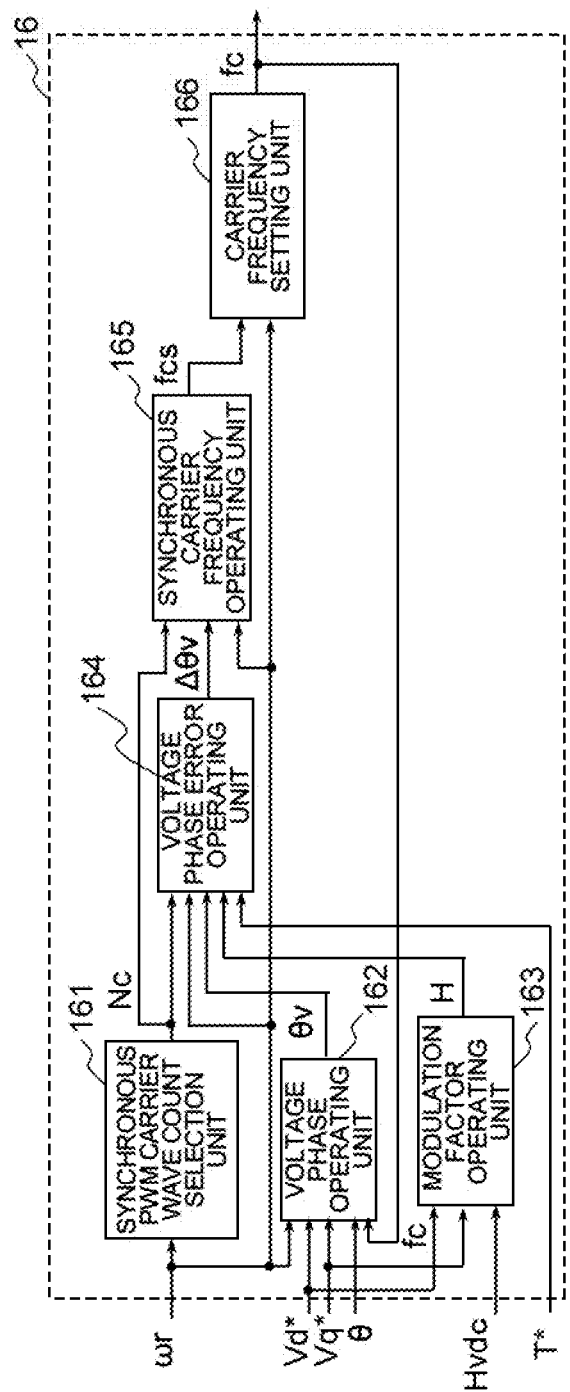
FIG. 3 is a block diagram showing a functional configuration of the carrier frequency adjustment unit according to the first embodiment of the present invention.

FIG. 3 is a block diagram showing a functional configuration of the carrier frequency adjustment unit 16 according to the first embodiment of the present invention. The carrier frequency adjustment unit 16 includes a synchronous PWM carrier wave count selection unit 161, a voltage phase operating unit 162, a modulation factor operating unit 163, a voltage phase error operating unit 164, a synchronous carrier frequency operating unit 165, and a carrier frequency setting unit 166.

The synchronous PWM carrier wave count selection unit 161 selects a synchronous PWM carrier wave count Nc representing a number of carrier waves relative to one period of the voltage waveform in the synchronous PWM control based on the rotation speed ωr. The synchronous PWM carrier wave count selection unit 161 selects a synchronous PWM carrier wave count Nc, for example, so that the value of Nc±3 or Nc×2 coincides with the order (multiple of six) of the electromagnetic excitation force or the torque pulsation generated by the motor 2 based on a fundamental current according to the voltage command. Specifically, for example, when the rotation speed ωr is less than a predetermined threshold, Nc=15, and when the rotation speed ωr is equal to or greater than the threshold, Nc=9. Consequently, the synchronous PWM carrier wave count Nc corresponding to the order of the electromagnetic excitation force or the torque pulsation generated by the motor 2 based on a fundamental current can be set to an optimal value according to the rotation speed ωr.

The reason why the synchronous PWM carrier wave count Nc is set as described above is now explained. The order of the pulsation (sideband component) of the harmonic current caused by pulse width modulation is expressed as Nc±2, Nc±4, Nc×2±1 by using the synchronous PWM carrier wave count Nc. The orders of the electromagnetic excitation force and the torque pulsation generated in the motor 2 by these sideband components will be Nc±3, Nc×2. Thus, in order to suppress the electromagnetic excitation force or the torque pulsation in the motor 2 caused by the fundamental current, it is desirable to adjust the triangular wave signal Tr, which is a carrier wave, so that the foregoing intended relationship is satisfied by setting the synchronous PWM carrier wave count Nc in the manner described above. It is thereby possible to set off the electromagnetic excitation force or the torque pulsation generated based on a fundamental current with the electromagnetic excitation force or the torque pulsation generated based on a carrier wave for use in pulse width modulation, and suppress the vibration and noise generated by the motor 2.

Figure 4:
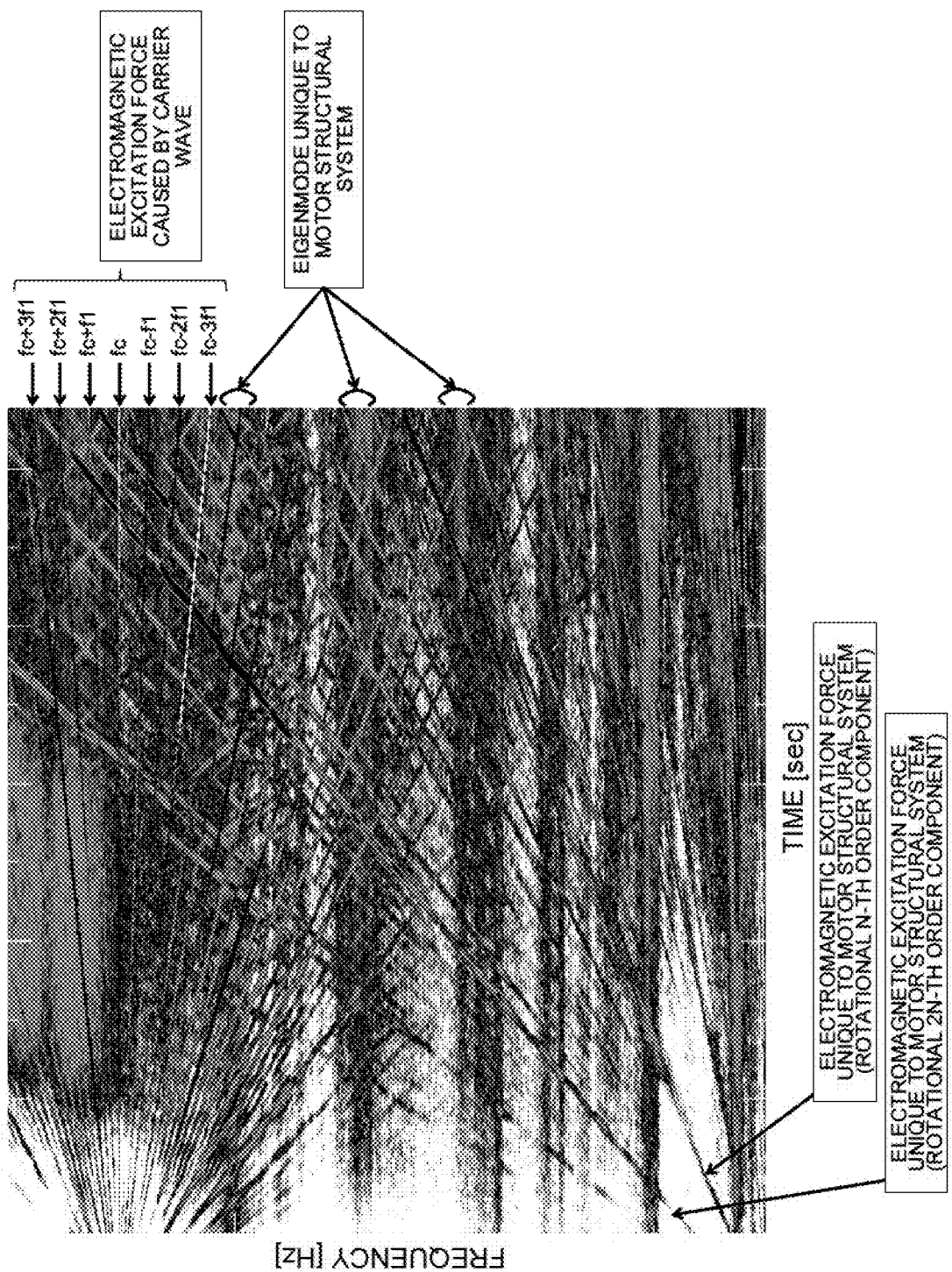
FIG. 4 is a diagram showing an example of actually measured data of the frequency spectral intensity of the sound and vibration when the carrier frequency is constant.

FIG. 4 is a diagram showing an example of actually measured data of the frequency spectral intensity of the sound and vibration when the carrier frequency is constant. FIG. 4 shows an example of the actually measured data of the frequency spectral intensity of the sound and vibration generated in the motor 2 when the frequency of the triangular wave signal Tr, which is a carrier wave, is caused to be constant, and the rotating speed of the motor 2 is increased from 0 rpm to an arbitrary rotating speed. In FIG. 4, the horizontal axis represents the elapsed time from the start of rotation of the motor 2, and the vertical axis represents the frequency. Moreover, in FIG. 4, the intensity of the sound and vibration is expressed by the contrasting density of the lines.

When viewing FIG. 4, it can be understood that the electromagnetic excitation force and the torque pulsation generated in the motor 2 caused by a carrier wave for use in pulse width modulation strongly appear on the frequency spectrum at the frequency of fc±3f1. Note that, in FIG. 4, the carrier frequency fc is constant. Moreover, f1 represents the frequency of the fundamental current according to the voltage command, and is proportional to the rotating speed (rotation speed ωr) of the motor 2.

In light of the above, the synchronous PWM carrier wave count selection unit 161 selects the synchronous PWM carrier wave count Nc to be the foregoing value based on the rotation speed ωr. For example, when the synchronous PWM carrier wave count is Nc=9, the orders of the electromagnetic excitation force and the torque pulsation generated in the motor 2 by the harmonic current caused by a carrier wave are calculated as 9−3=6, 9+3=12, 9×2=18 based on the foregoing formula. Each of these calculated orders coincides with a multiple of six as the orders of the electromagnetic excitation force and the torque pulsation generated by the fundamental current. Moreover, when the synchronous PWM carrier wave count is set to Nc=15, each of these calculated orders will similarly coincide with a multiple of six as the orders of the electromagnetic excitation force and the torque pulsation generated by the fundamental current. Thus, the electromagnetic excitation force and the torque pulsation generated by a fundamental current can be set off with the electromagnetic excitation force and the torque pulsation generated by the carrier wave for use in pulse width modulation.

Note that the synchronous PWM carrier wave count selection unit 161 can select the synchronous PWM carrier wave count Nc not only based on the rotation speed ωr, but also based on the torque command T*. Moreover, the selection criteria of the synchronous PWM carrier wave count Nc may also be changed when the rotation speed ωr increases and when the rotation speed ωr decreases, for example, by setting a hysteresis.

The voltage phase operating unit 162 operates a voltage phase θv according to Formula (1) to Formula (4) below based on the d-axis voltage command Vd* and the q-axis voltage command Vq*, the rotational position θ, the rotation speed ωr, and the carrier frequency fc.

$$\theta v = \theta + \varphi v + \varphi dqv + 0.5\pi \quad (1)$$

$$\varphi v = \omega r \cdot 1.5 Tc \quad (2)$$

$$Tc = 1/fc \quad (3)$$

$$\varphi dqv = a\tan(Vq/Vd) \quad (4)$$

Here, let it be assumed that φv represents an operation delay compensation value of the voltage phase, Tc represents a carrier wave period, and φdqv represents a voltage phase from the d-axis, respectively. The operation delay compensation value φv is a value that compensates the generation of 1.5 control period worth of an operation delay during the period from the time that the rotational position detector 41 acquires the rotational position θ to the time that the motor control device 1 outputs a gate signal to the inverter 3. Note that, in this embodiment, 0.5π is added at the fourth term on the right side of Formula (1). Since the voltage phase operated in the first term to the third term on the right side of Formula (1) is a cos wave, this is an operation for performing a view-point conversion of the cos wave into a sin wave.

The modulation factor operating unit 163 operates a modulation factor H based on the d-axis voltage command Vd* and the q-axis voltage command Vq*, and the power source voltage Hvdc, according to Formula (5) below. Note that the modulation factor H represents a voltage amplitude ratio of the DC power supplied from the high-voltage battery 5 to the inverter 3 and the AC power output from the inverter 3 to the motor 2.

$$H = \sqrt{(Vd^2 + Vq^2)}/(Hvdc/2) \quad (5)$$

The voltage phase error operating unit 164 operates a voltage phase error Lev based on the synchronous PWM carrier wave count Nc selected by the synchronous PWM carrier wave count selection unit 161, the voltage phase θv operated by the voltage phase operating unit 162, the modulation factor H operated by the modulation factor operating unit 163, the rotation speed ωr, and the torque command T*. The voltage phase error Δθv represents a phase difference of the three-phase voltage commands Vu*, Vv*, Vw*, which are voltage commands to the inverter 3, and the triangular wave signal Tr, which is a carrier wave for use in pulse width modulation. By the voltage phase error operating unit 164 operating the voltage phase error Δθv for each predetermined operating period, the frequency adjustment of the triangular wave signal Tr can be performed so as to change the phase difference of the voltage commands to the inverter 3 and the carrier wave for use in pulse width modulation in the carrier frequency adjustment unit 16.

The synchronous carrier frequency operating unit 165 operates a synchronous carrier frequency fcs based on the voltage phase error Δθv operated by the voltage phase error operating unit 164, the rotation speed ωr and the synchronous PWM carrier wave count Nc selected by the synchronous PWM carrier wave count selection unit 161 according to Formula (6) below.

$$fcs = \omega r \cdot Nc \cdot (1 + \Delta\theta v \cdot K)/(2\pi) \quad (6)$$

The synchronous carrier frequency operating unit 165 can operate the synchronous carrier frequency fcs according to Formula (6), for example, via PLL (Phase Locked Loop) control. Note that, in Formula (6), gain K may be a constant value, or may be variable depending on the condition.

The carrier frequency setting unit 166 selects either the synchronous carrier frequency fcs operated by the synchronous carrier frequency operating unit 165 or an asynchronous carrier frequency fcns based on the rotation speed ωr, and outputs the selection as a carrier frequency fc. The asynchronous carrier frequency fcns is a constant value that is pre-set in the carrier frequency setting unit 166. Note that it is also possible to prepare a plurality of asynchronous carrier frequencies fcns in advance, and select one among such plurality of asynchronous carrier frequencies fcns according to the rotation speed ωr. For example, it is possible to select the asynchronous carrier frequency fcns in the carrier frequency setting unit 166 and output it as the carrier frequency fc so that, as the value of the rotation speed ωr is greater, the value of the asynchronous carrier frequency fcns will increase.

Details of the operating method of the voltage phase error Δθv in the voltage phase error operating unit 164 of the carrier frequency adjustment unit 16 are now explained.

Figure 5:
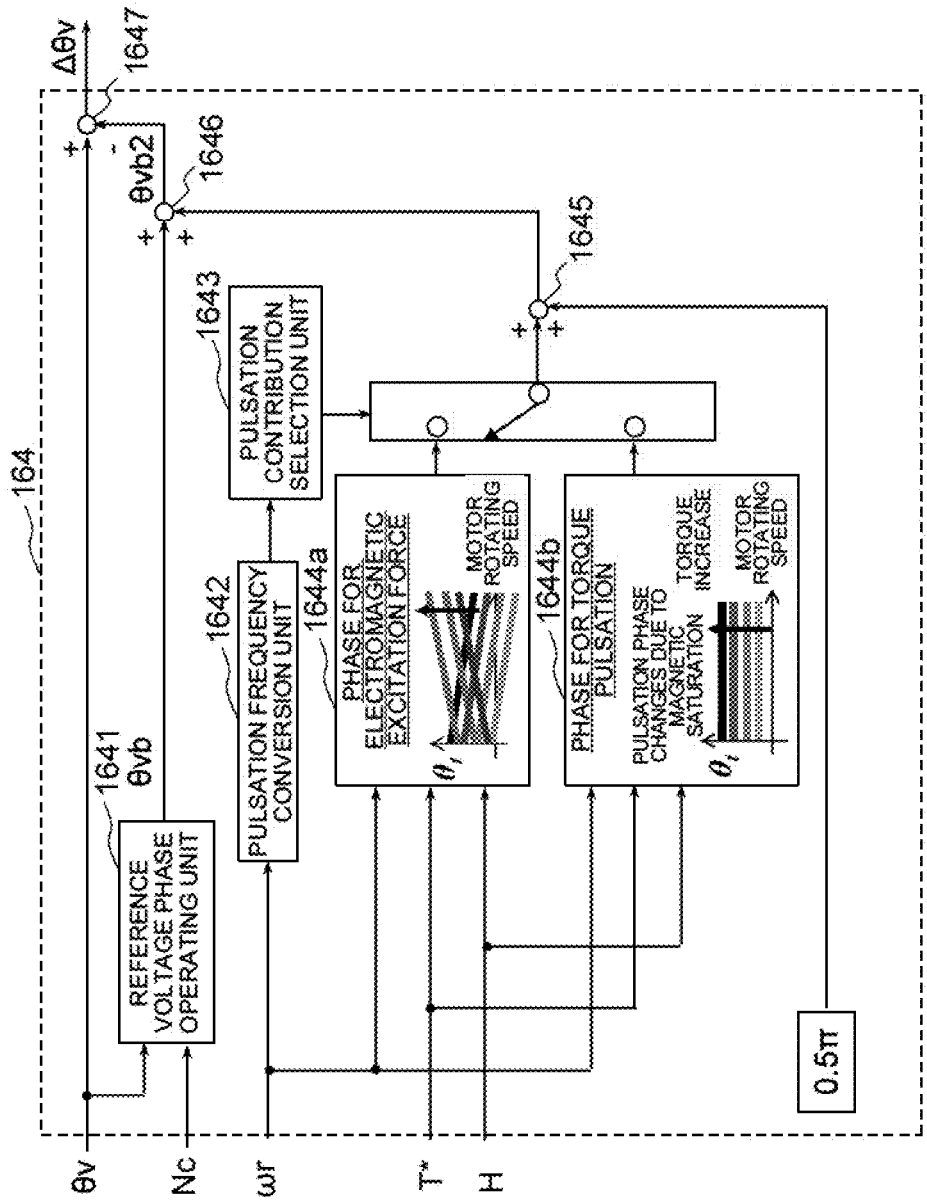
FIG. 5 is a block diagram showing a functional configuration of the voltage phase error operating unit according to the first embodiment of the present invention.

FIG. 5 is a block diagram showing a functional configuration of the voltage phase error operating unit 164 according to the first embodiment of the present invention. The voltage phase error operating unit 164 includes a reference voltage phase operating unit 1641, a pulsation frequency conversion unit 1642, a pulsation contribution selection unit 1643, an electromagnetic excitation force reduction phase difference table 1644a, a torque pulsation reduction phase difference table 1644b, a voltage phase difference conversion unit 1645, an addition unit 1646, and a subtraction unit 1647.

The reference voltage phase operating unit 1641 operates a reference voltage phase θvb for fixing a phase of the carrier wave in the synchronous PWM control based on the synchronous PWM carrier wave count Nc and the voltage phase θv. As a result of the reference voltage phase operating unit 1641 operating the reference voltage phase θvb, the period of the carrier wave relative to the voltage phase θv and the period of the electromagnetic excitation force and the torque pulsation generated in the motor 2 by the fundamental current can be made to coincide with each other.

Figure 6:
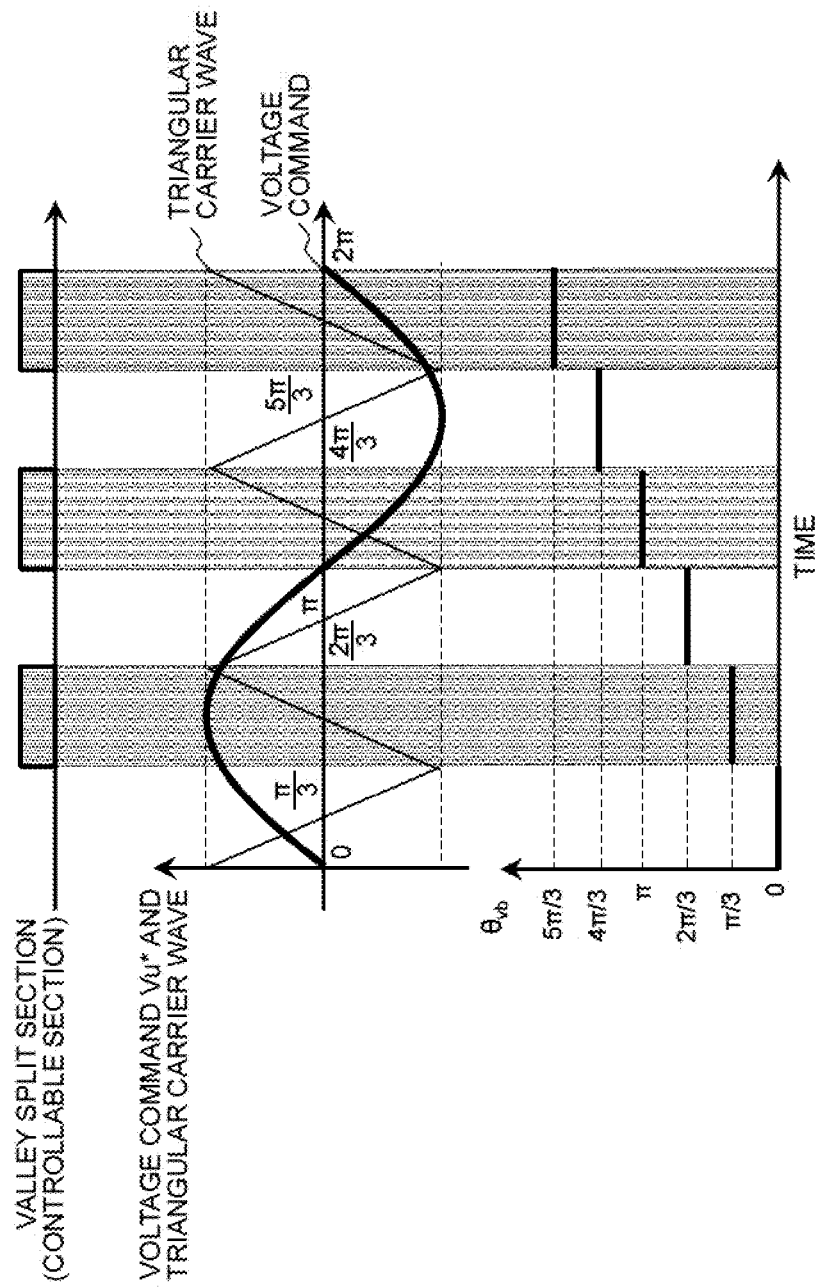
FIG. 6 is a conceptual diagram of the reference voltage phase operation.

FIG. 6 is a conceptual diagram of the reference voltage phase operation performed by the reference voltage phase operating unit 1641. The reference voltage phase operating unit 1641 operates the reference voltage phase θvb which changes stepwise in a number of steps according to the synchronous PWM carrier wave count Nc between 0 and 2π, for example, as shown in FIG. 6. Note that, while an example where the synchronous PWM carrier wave count Nc is 3 is illustrated in FIG. 6 so as to facilitate the explanation, in effect the synchronous PWM carrier wave count Nc is preferably Nc=9 or Nc=15 as explained above.

In this embodiment, in order to reduce the processing load, for example, as shown in FIG. 6, the carrier frequency adjustment unit 16 adjusts the frequency of the carrier wave only in the valley split section which is a section in which the triangular carrier wave rises from a minimum value (valley) to a maximum value (mountain). In the foregoing case, as described above, the synchronous carrier frequency operating unit 165 performs synchronous PWM control by sequentially operating the synchronous carrier frequency fcs from the voltage phase error Lev in the valley split section of the carrier wave. The reference voltage phase operating unit 1641 calculates the reference voltage phase θvb for use in operating the voltage phase error Δθv as a discrete value which changes in π/3 intervals as shown in FIG. 6. Note that the interval of the reference voltage phase θvb changes according to the synchronous PWM carrier wave count Nc. As the synchronous PWM carrier wave count Nc becomes greater, the interval of the reference voltage phase θvb will decrease.

Specifically, the reference voltage phase operating unit 1641 operates the reference voltage phase θvb based on the voltage phase θv and the synchronous PWM carrier wave count Nc according to Formula (7) and Formula (8) below.

$$\theta vb = \text{int}(\theta v/\theta s) \cdot \theta s + 0.5\theta s \quad (7)$$

$$\theta s = 2\pi/Nc \quad (8)$$

Here, θs represents the variation width of the voltage phase θv for each carrier wave, and int represents the round-off operation after the decimal point.

Note that, in this embodiment, the reference voltage phase operating unit 1641 operates the reference voltage phase θvb according to Formula (7) and Formula (8) so that the reference voltage phase θvb becomes 0 rad in the mountain split section which is a section in which the triangular carrier wave falls from a maximum value (mountain) to a minimum value (valley). Nevertheless, the period that the reference voltage phase θvb becomes 0 rad is not limited to the mountain split section. If it is possible to operate the reference voltage phase θvb which changes stepwise in a number of steps according to the synchronous PWM carrier wave count Nc between 0 and 2π using the voltage phase θv, the reference voltage phase operating unit 1641 may also operate the reference voltage phase θvb based on an operating method other than Formula (7) and Formula (8).

The pulsation frequency conversion unit 1642 converts the rotation speed ωr into a pulsation frequency fr according to Formula (9) below.

$$fr = \omega r \cdot 4 \cdot Nr/(2\pi) \quad (9)$$

Here, Nr represents the orders of the electromagnetic excitation force and the torque pulsation generated by the fundamental current, and are a multiple of six (6, 12, 18, 24 . . . ) as described above. The pulsation frequency conversion unit 1642 can set the value of Nr according to the orders of the electromagnetic excitation force and the torque pulsation to be suppressed.

The pulsation contribution selection unit 1643 selects either the electromagnetic excitation force generated in the radial direction of the motor 2 or the torque pulsation generated in the circumferential direction of the motor 2, whichever contributes more to the vibration and noise generated in the motor 2, based on the pulsation frequency fr obtained by the pulsation frequency conversion unit 1642.

Figure 7:
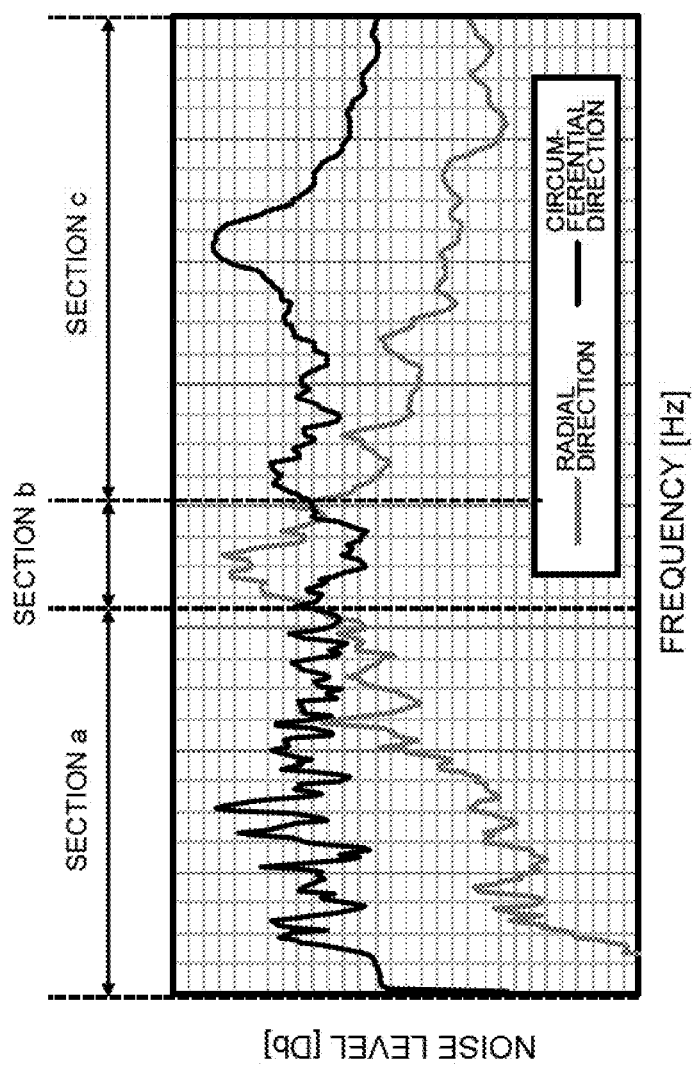
FIG. 7 is a diagram showing an example of the noise level based on the electromagnetic excitation force and the torque pulsation for each frequency generated by the motor.

FIG. 7 is a diagram showing an example of the noise level based on the electromagnetic excitation force and the torque pulsation for each frequency generated in the motor 2. In FIG. 7, the horizontal axis represents the frequency, and the vertical axis represents the magnitude of the noise level. Based on FIG. 7, it can be understood that the noise level based on the torque pulsation in the circumferential direction in sections a, c is higher, and the noise level based on the electromagnetic excitation force in the radial direction in section b is higher. The frequency characteristics of this kind of noise level are unique to the specification of the motor 2 since they are determined based on the structure of the motor 2. Thus, by acquiring in advance the relationship of the noise level for each frequency shown in FIG. 7 based on simulation or actual measurement, the pulsation contribution selection unit 1643 can select one of either the electromagnetic excitation force or the torque pulsation, whichever contributes more to the vibration and noise generated in the motor 2, based on the pulsation frequency fr according to the rotation speed ωr.

The electromagnetic excitation force reduction phase difference table 1644a is a table representing the phase difference for reducing the electromagnetic excitation force of the motor 2, and the torque pulsation reduction phase difference table 1644b is a table representing the phase difference for reducing the torque pulsation of the motor 2. Here, the term "phase difference" means the phase difference relative to the reference voltage phase θvb. These tables are each set relative to the plurality of values of the rotation speed ωr, the torque command T* and the modulation factor H. In the voltage phase error operating unit 164, by referring to each of these tables based on the rotation speed ωr, the torque command T*, and the modulation factor H, the phase difference suitable for reducing the electromagnetic excitation force and the phase difference suitable for reducing the torque pulsation can be respectively identified.

For example, based on simulation or actual measurement, the phase difference data relative to the reference voltage phase θvb capable of reducing the electromagnetic excitation force and the torque pulsation are acquired in advance for each of the rotation speed ωr, the torque command T*, and the modulation factor H. The electromagnetic excitation force reduction phase difference table 1644a and the torque pulsation reduction phase difference table 1644b are respectively set based on these pre-acquired phase difference data. Here, the reason why the electromagnetic excitation force reduction phase difference table 1644a and the torque pulsation reduction phase difference table 1644b are set for each modulation factor H is in order to compensate the change of the dominant orders of the electromagnetic excitation force and the torque pulsation, which are generated by the harmonic current, according to the modulation factor H. Note that the phase difference output based on these tables may be either the current phase difference or the voltage phase difference. In this embodiment, the phase difference output from each of the electromagnetic excitation force reduction phase difference table 1644a and the torque pulsation reduction phase difference table 1644b is the current phase difference, and the current phase difference is converted into a voltage phase difference in the subsequent-stage voltage phase difference conversion unit 1645.

Figure 8:
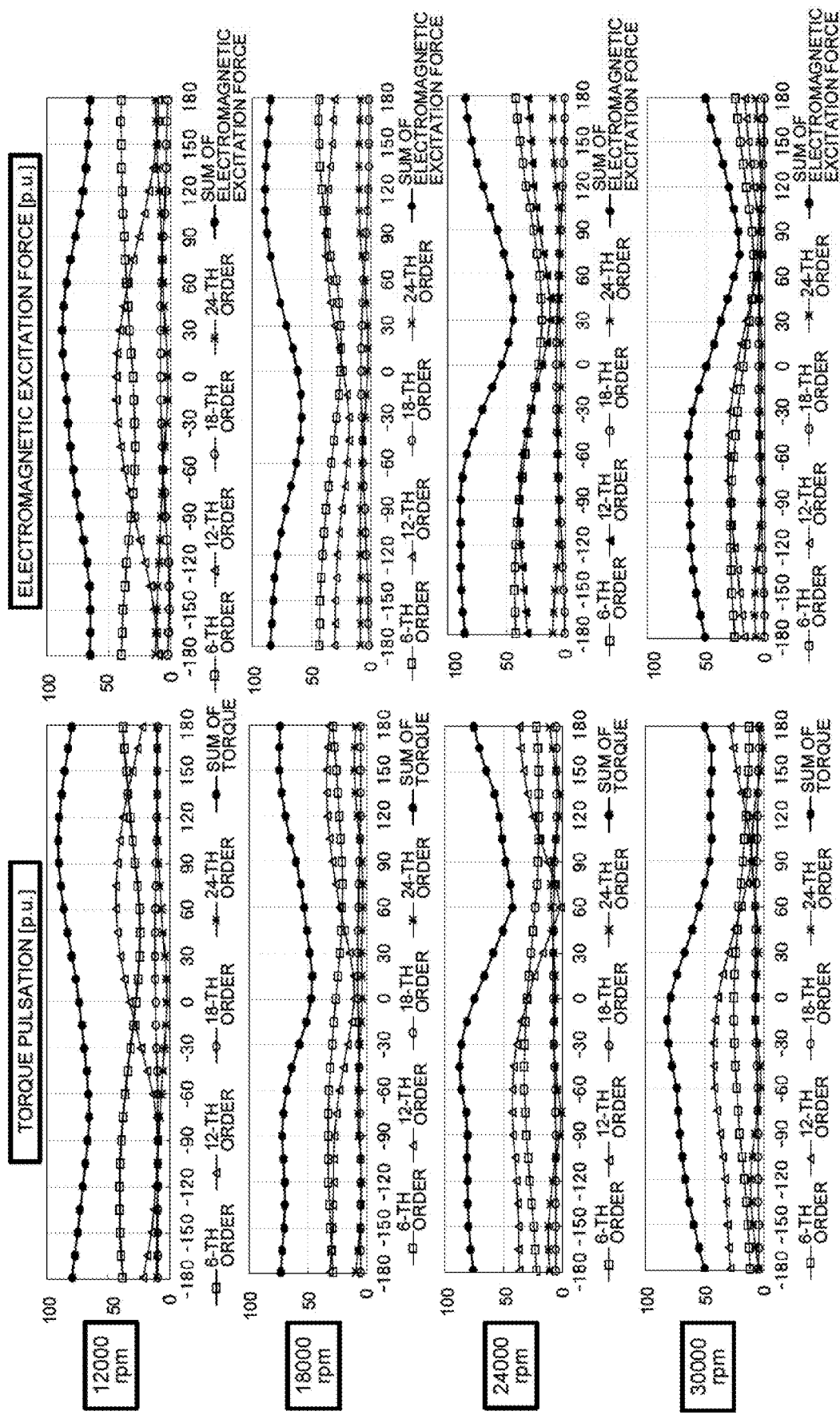
FIG. 8 is a diagram showing phase difference data examples of a torque pulsation and an electromagnetic excitation force relative to reference voltage phases $\theta vb$, for the reference voltage phases $\theta vb$ at each rotation speed $\omega r$.
Figure 9:
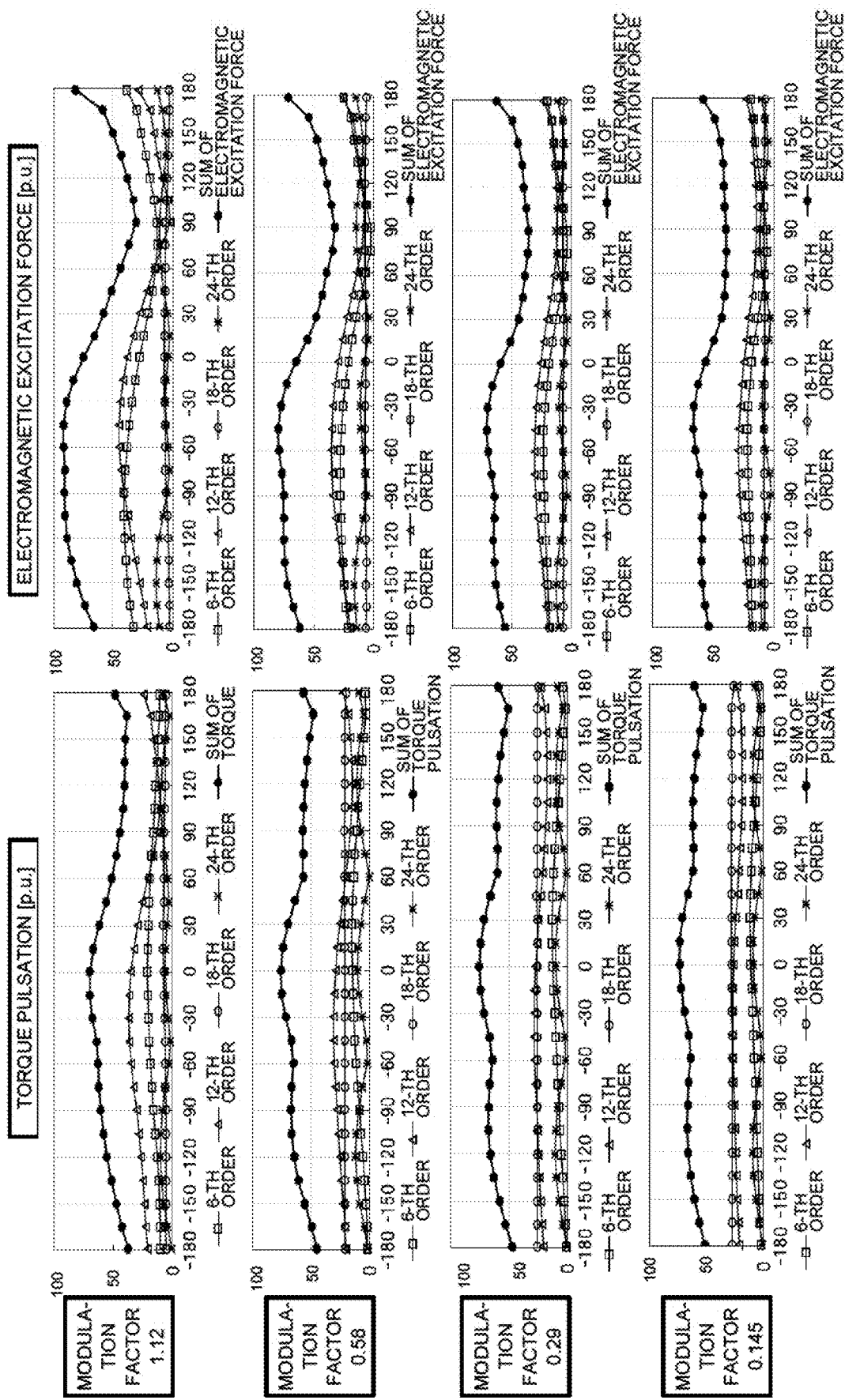
FIG. 9 is a diagram showing phase difference data examples of a torque pulsation and an electromagnetic excitation force relative to reference voltage phases $\theta vb$, for the reference voltage phases $\theta vb$ at each modulation factor H.

FIG. 8 is a diagram showing phase difference data examples of the torque pulsation and the electromagnetic excitation force relative to reference voltage phases θvb, for the reference voltage phases θvb at each rotation speed ωr. FIG. 9 is a diagram showing phase difference data examples of the torque pulsation and the electromagnetic excitation force relative to reference voltage phases θvb, for the reference voltage phases θvb at each modulation factor H. Note that, since the torque command T* also changes according to the rotation speed ωr, in FIG. 8, phase difference data of the torque pulsation and the electromagnetic excitation force relative to reference voltage phases θvb, for the reference voltage phases θvb at each torque command T*, are also shown.

In FIG. 8 and FIG. 9, in the range where the phase difference relative to the reference voltage phase θvb is −180° to +180°, as the torque pulsation and the electromagnetic excitation force generated in the motor 2 by the fundamental current according to the voltage command as described above, the magnitude of the torque pulsation and the electromagnetic excitation force in each order of the $6^{th}$ order, $12^{th}$ order, $18^{th}$ order and $24^{th}$ order, which are multiples of six, and the sum of the torque pulsation and the sum of the electromagnetic excitation force obtained by totaling all such torque pulsation and electromagnetic excitation force are shown, respectively. The voltage phase error operating unit 164 can set the torque pulsation reduction phase difference table 1644*b* and the electromagnetic excitation force reduction phase difference table 1644*a* by creating, for example, a table for each of the phase difference in which the sum of the torque pulsation becomes smallest and the phase difference in which the sum of the electromagnetic excitation force becomes smallest based on these phase difference data. Otherwise, the torque pulsation reduction phase difference table 1644*b* and the electromagnetic excitation force reduction phase difference table 1644*a* can also be set by creating a table for the phase difference capable of effectively reducing the torque pulsation or the electromagnetic excitation force of a specific order, such as the $12^{th}$ order, for the purpose of avoiding a resonant frequency.

When the pulsation contribution selection unit 1643 selects the electromagnetic excitation force as contributing more to the vibration and noise generated in the motor 2, the current phase difference identified in the electromagnetic excitation force reduction phase difference table 1644*a* based on the rotation speed ωr, the torque command T*, and the modulation factor H is input to the voltage phase difference conversion unit 1645. Meanwhile, when the pulsation contribution selection unit 1643 selects the torque pulsation as contributing more to the vibration and noise generated in the motor 2, the current phase difference identified in the torque pulsation reduction phase difference table 1644*b* based on the rotation speed ωr, the torque command T*, and the modulation factor H is input to the voltage phase difference conversion unit 1645.

The voltage phase difference conversion unit 1645 converts the current phase difference into a voltage phase difference by adding 0.5π to the current phase difference input from the electromagnetic excitation force reduction phase difference table 1644*a* or the torque pulsation reduction phase difference table 1644*b*. Here, the reason why 0.5π is added is because, since a harmonic current is not easily influenced by resistance in comparison to a fundamental current, the derivative value (0.5π advancement) of the harmonic current flowing to the inductance component of the motor 2 is mainly influenced by the voltage of the motor 2. Note that, as described above, when the phase difference output from each of the electromagnetic excitation force reduction phase difference table 1644*a* and the torque pulsation reduction phase difference table 1644*b* is caused to be a voltage phase difference, there is no need to provide the voltage phase difference conversion unit 1645.

The addition unit 1646 adds the voltage phase difference operated by the voltage phase difference conversion unit 1645 to the reference voltage phase θvb operated by the reference voltage phase operating unit 1641, thereby operating the correction reference voltage phase θvb2 for reducing the electromagnetic excitation force or the torque pulsation generated based on the harmonic current.

The subtraction unit 1647 subtracts the correction reference voltage phase θvb2 from the voltage phase θv, thereby operating the voltage phase error Δθv.

The voltage phase error operating unit 164 operates the voltage phase error Δθv as explained above. It is thereby possible to decide the voltage phase error Δθv based on the rotation speed ter, the torque command T*, and the modulation factor H so that the torque pulsation and the electromagnetic excitation force generated based on a fundamental current according to the three-phase voltage commands Vu*, Vv*, Vw*; that is, the torque pulsation and the electromagnetic excitation force of each harmonic component having a multiple of six as its order among the harmonic components of the fundamental current, are set off with the torque pulsation and the electromagnetic excitation force generated based on a carrier wave for use in pulse width modulation. Consequently, the carrier frequency fc can be set by changing the phase difference of the voltage command to the inverter 3 and the carrier wave for use in pulse width modulation so as to reduce the torque pulsation or the electromagnetic excitation force generated in the motor 2.

Figure 10:
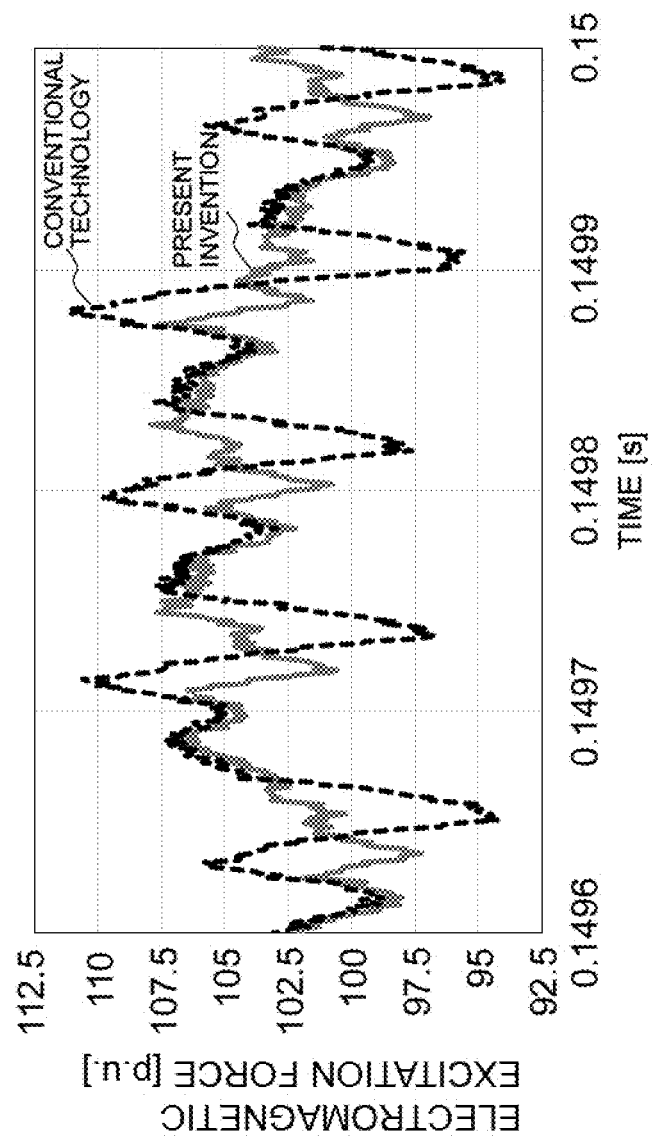
FIG. 10 is a diagram showing a reduction effect of the electromagnetic excitation force according to the present invention.

FIG. 10 is a diagram showing a reduction effect of the electromagnetic excitation force according to the present invention. In FIG. 10, an example of the electromagnetic excitation force generated based on a fundamental current when the present invention is not applied is shown with a broken line (conventional technology), and an example of the electromagnetic excitation force generated based on a fundamental current when the present invention is applied is shown with a solid line (present invention). Note that a case of not applying the present invention corresponds to a case where the voltage phase error Lev is operated based on the difference of the voltage phase θv and the reference voltage phase θvb, and the operated voltage phase error Δθv is used to perform synchronous PWM control. Meanwhile, a case of applying the present invention is a case where, as explained above, the voltage phase error Δθv is operated based on the phase difference obtained from the electromagnetic excitation force reduction phase difference table 1644*a*; that is, the correction reference voltage phase θvb2 obtained by adding, to the reference voltage phase θvb, the phase difference capable of reducing the electromagnetic excitation force of the motor 2, and the operated voltage phase error Lev is used to perform synchronous PWM control. When viewing FIG. 10, the case of applying the present invention is able to reduce the electromagnetic excitation force more in comparison to the case of not applying the present invention, and it can be confirmed that the present invention is effective.

Figure 11:
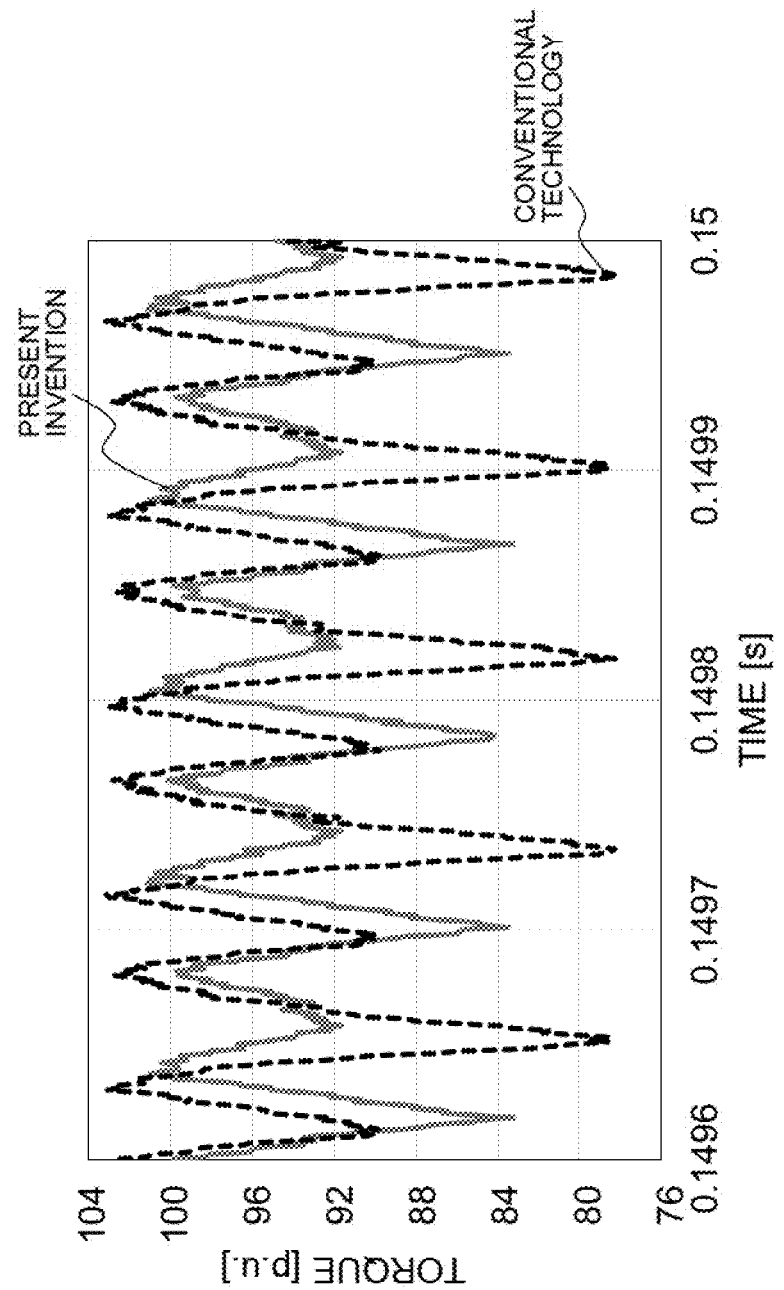
FIG. 11 is a diagram showing a reduction effect of the torque pulsation according to the present invention.

FIG. 11 is a diagram showing a reduction effect of the torque pulsation according to the present invention. In FIG. 11, an example of the torque pulsation generated based on a fundamental current when the present invention is not applied is shown with a broken line (conventional technology), and an example of the torque pulsation generated based on a fundamental current when the present invention is applied is shown with a solid line (present invention). Note that a case of not applying the present invention corresponds to a case where the voltage phase error Δθv is operated based on the difference of the voltage phase θv and the reference voltage phase θvb, and the operated voltage phase error Δθv is used to perform synchronous PWM control. Meanwhile, a case of applying the present invention is a case where, as explained above, the voltage phase error Δθv is operated based on the phase difference obtained from the torque pulsation reduction phase difference table 1644b; that is, the correction reference voltage phase θvb2 obtained by adding, to the reference voltage phase θvb, the phase difference capable of reducing the torque pulsation of the motor 2, and the operated voltage phase error Δθv is used to perform synchronous PWM control. When viewing FIG. 11, the case of applying the present invention is able to reduce the torque pulsation more in comparison to the case of not applying the present invention, and it can be confirmed that the present invention is effective.

Note that, in the carrier frequency adjustment unit 16, the foregoing processing may be performed irrespective of whether the motor 2 is in a state of power running drive or in a state of regenerative drive. The torque command T* becomes a positive value when the motor 2 is in a state of power running drive, and the torque command T* becomes a negative value when the motor 2 is in a state of regenerative drive. Accordingly, the carrier frequency adjustment unit 16 can change the voltage phase error Δθv and set the carrier frequency fc so as to reduce the torque pulsation or the electromagnetic excitation force generated in the motor 2 by determining whether the motor 2 is in a state of power running drive or regenerative drive based on the value of the torque command T*, and performing the foregoing operational processing in the voltage phase error operating unit 164 based on a result of the determination.

According to the embodiment of the present invention explained above, the present invention yields the following effects.

(1) A motor control device 1 controls a drive of a motor 2 that is connected to an inverter 3 which converts power from DC power to AC power, and driven with the AC power, and comprises a triangular wave generation unit 17 which generates a triangular wave signal Tr that is a carrier wave, a carrier frequency adjustment unit 16 which adjusts a carrier frequency fc that represents a frequency of the triangular wave signal Tr, and a gate signal generation unit 18 which performs pulse-width modulation on three-phase voltage commands Vu*, Vv*, Vw* according to a torque command T* using the triangular wave signal Tr, thereby generating a gate signal for controlling an operation of the inverter 3. The carrier frequency adjustment unit 16 adjusts the carrier frequency fc so as to change a voltage phase error Δθv representing a phase difference of the three-phase voltage commands Vu*, Vv*, Vw* and the triangular wave signal Tr based on the torque command T*, and a rotation speed car of the motor 2. As a result of adopting the foregoing configuration, the vibration and noise generated in the motor 2 can be effectively suppressed.

(2) The carrier frequency adjustment unit 16 adjusts the carrier frequency fc so that the carrier frequency fc becomes an integral multiple of a frequency of the three-phase voltage commands Vu*, Vv*, Vw* by causing the synchronous PWM carrier wave count selection unit 161 to select the synchronous PWM carrier wave count Nc to be a predetermined integer value. As a result of adopting the foregoing configuration, the period and the phase of the triangular wave signal Tr, which is a carrier wave, can respectively be adjusted to be an intended relationship relative to a voltage waveform of the three-phase voltage commands Vu*, Vv*, Vw*, and the synchronous PWM control can thereby be reliably performed.

(3) The carrier frequency adjustment unit 16 causes a pulsation contribution selection unit 1643 to select one of either a torque pulsation generated in a circumferential direction of the motor 2 or an electromagnetic excitation force generated in a radial direction of the motor 2 based on the rotation speed ωr of the motor 2. Subsequently, the carrier frequency adjustment unit 16 causes a voltage phase error operating unit 164 to change the voltage phase error Δθv so as to reduce the selected torque pulsation or electromagnetic excitation force. As a result of adopting the foregoing configuration, the vibration and noise, which are generated by the motor 2 in which the noise level based on the torque pulsation and the noise level based on the electromagnetic excitation force respectively have the frequency characteristics shown in FIG. 7, can be effectively suppressed at an arbitrary rotating speed.

(4) The carrier frequency adjustment unit 16 changes the voltage phase error Δθv based on the torque command T*, the rotation speed ωr, and a modulation factor H which is operated by the modulation factor operating unit 163 and represents a voltage amplitude ratio of the DC power supplied from the inverter 3 and the AC power output from the inverter 3. As a result of adopting the foregoing configuration, the dominant order of the electromagnetic excitation force and the torque pulsation generated by the harmonic current will change according to the modulation factor H, and, consequently, even in cases where the vibration and noise of the motor 2 change according to the modulation factor H, such change can be reliably compensated, and the vibration and noise generated by the motor 2 can be effectively suppressed.

(5) The carrier frequency adjustment unit 16 changes the voltage phase error Δθv based on each harmonic component having a multiple of six as its order among harmonic components of a fundamental current according to the three-phase voltage commands Vu*, Vv*, Vw* by referring to an electromagnetic excitation force reduction phase difference table 1644a and a torque pulsation reduction phase difference table 1644b. As a result of adopting the foregoing configuration, the electromagnetic excitation force and the torque pulsation generated by the fundamental current can be set off with the electromagnetic excitation force and the torque pulsation generated by the carrier wave for use in the pulse width modulation, and the vibration and noise generated in the motor 2 can thereby be effectively suppressed.

(6) The carrier frequency adjustment unit 16 may also determine whether the motor 2 is in a state of either a power running drive or a regenerative drive based on the torque command T*, and thereby change the voltage phase error Lev based on a result of the determination. As a result of adopting the foregoing configuration, optimal control can be realized according to the drive state of the motor 2.

Second Embodiment (Series Hybrid System)

The second embodiment of the present invention is now explained. This embodiment explains an example of applying the present invention to a hybrid system combining a motor and an engine.

Figure 12:
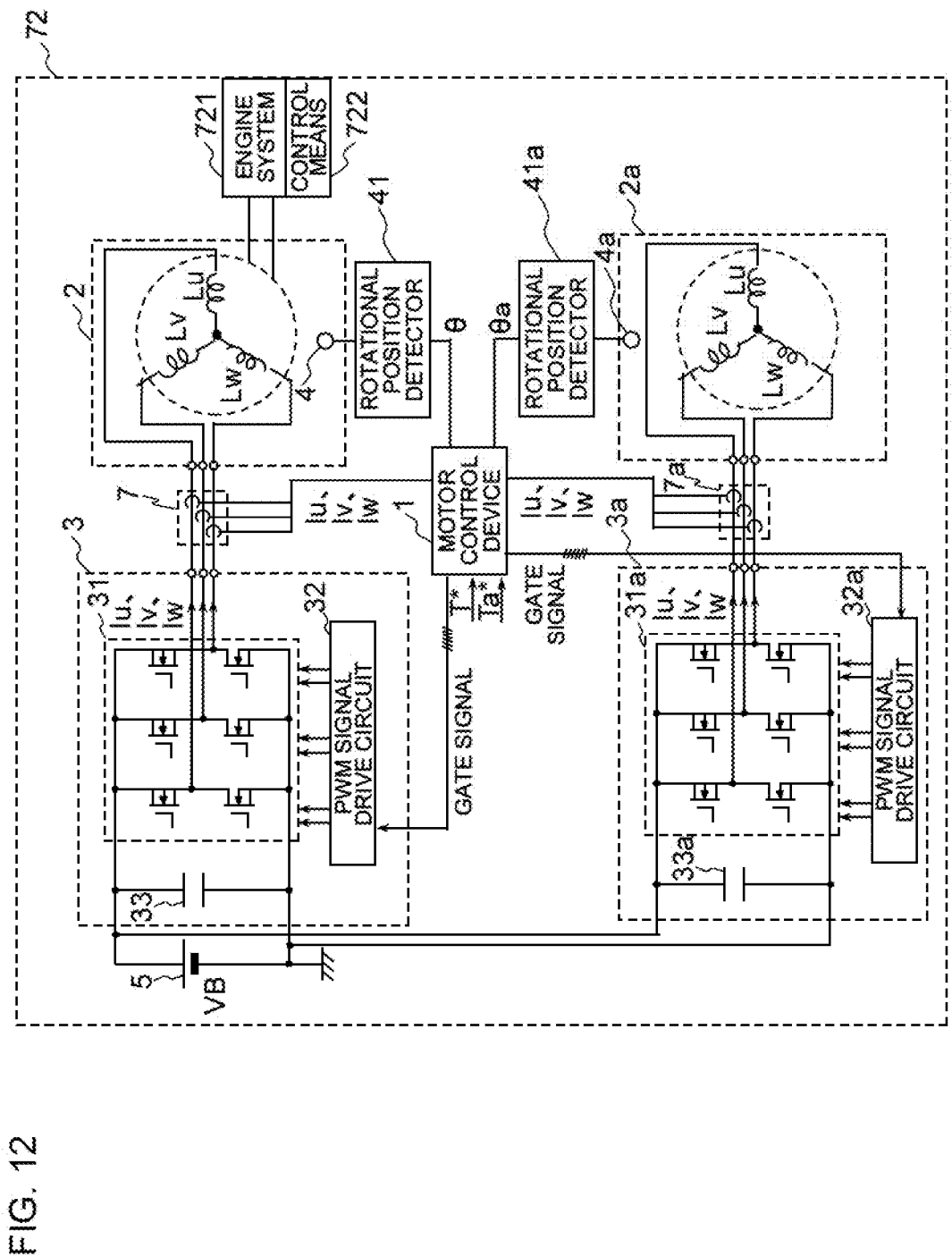
FIG. 12 is a diagram showing a configuration of the hybrid system according to the second embodiment of the present invention.

FIG. 12 is a diagram showing a configuration of the hybrid system according to the second embodiment of the present invention. The hybrid system 72 includes the motor control device 1, the motor 2, the inverter 3, the rotational position detector 41 and the high-voltage battery 5 explained in the first embodiment, as well as a motor 2a, an inverter 3a and a rotational position detector 41a which respectively correspond to the motor 2, the inverter 3, and the rotational position detector 41.

A rotational position sensor 4a for detecting a rotational position ea of the rotor is mounted on the motor 2a. The rotational position detector 41a operates the rotational position ea from an input signal of the rotational position sensor 4a, and outputs the operated rotational position ea to the motor control device 1. A current detection means 7a is disposed between the inverter 3a and the motor 2a.

The inverter 3a includes an inverter circuit 31a, a PWM signal drive circuit 32a and a smoothing capacitor 33a. The PWM signal drive circuit 32a is connected to the motor control device 1 which is common with the PWM signal drive circuit 32 of the inverter 3, and generates a PWM signal for controlling each switching device equipped in the inverter circuit 31a based on the gate signal input from the motor control device 1, and outputs the generated PWM signal to the inverter circuit 31a. The inverter circuit 31a and the smoothing capacitor 33a are connected to the high-voltage battery 5 which is common with the inverter circuit 31 and the smoothing capacitor 33.

A torque command T* to the motor 2 and a torque command Ta* to the motor 2a are input to the motor control device 1. The motor control device 1 generates gate signals for controlling the drive of the respective motors 2, 2a based on these torque commands according to the method explained in the first embodiment, and outputs the generated gate signals to the inverters 3, 3a, respectively. In other words, the voltage phase error operating unit 164 is used to operate the voltage phase error and adjust the frequency of the carrier wave so that the vibration and noise generated in the respective motors 2, 2a can be suppressed. Note that the electromagnetic excitation force reduction phase difference table 1644a and the torque pulsation reduction phase difference table 1644b referenced in the foregoing operation may be, for example, values capable of most effectively reducing the electromagnetic excitation force or the torque pulsation in the respective motors 2, 2a. Otherwise, while they may not be values capable of most effectively reducing the electromagnetic excitation force or the torque pulsation independently, they may be values capable of most effectively reducing the electromagnetic excitation force or the torque pulsation when totaling the pulsations of the motors 2, 2a.

An engine system 721 and a control means 722 are connected to the motor 2. The engine system 721 is driven based on the control of the control means 722, and rotatably drives the motor 2. The motor 2 operates as a generator by being rotatably driven by the engine system 721, and generates AC power. The AC power generated by the motor 2 is converted into DC power by the inverter 3, and recharges the high-voltage battery 5. It is thereby possible to cause the hybrid system 72 to function as a series hybrid system. Note that the engine system 721 and the control means 722 may also be configured to be connectable to the motor 2a.

Third Embodiment (Boost Converter System)

The third embodiment of the present invention is now explained. This embodiment explains an example of applying the present invention to a boost converter system.

Figure 13:
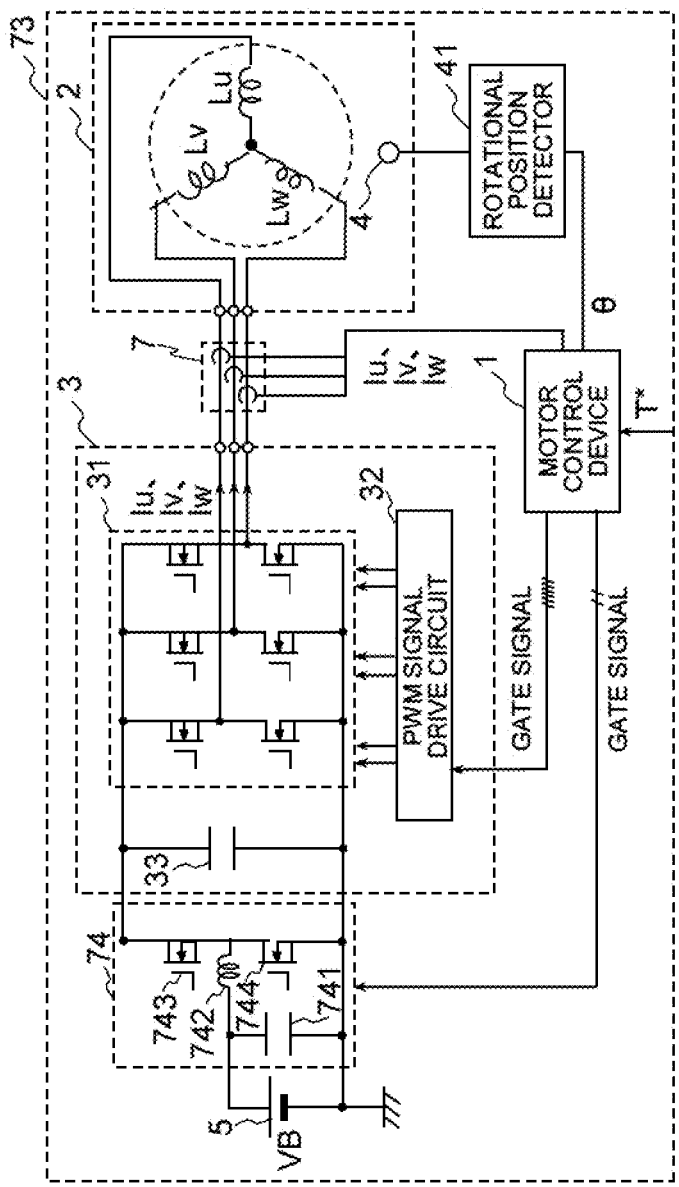
FIG. 13 is a diagram showing a configuration of the boost converter system according to the third embodiment of the present invention.

FIG. 13 is a diagram showing a configuration of the boost converter system according to the third embodiment of the present invention. The boost converter system 73 includes the motor control device 1, the motor 2, the inverter 3, the rotational position detector 41 and the high-voltage battery 5 explained in the first embodiment, as well as a boost converter 74.

The boost converter 74 serially connects switching devices 743, 744, and the high-voltage battery 5 is connected to an intermediate connection point of the serially connected switching devices 743, 744 via a reactor 742. Moreover, a capacitor 741 is connected to the high-voltage battery 5 in parallel.

The boost converter 74 boosts the DC voltage supplied from the high-voltage battery 5 to the most efficient DC voltage of the boost converter system 73 as a result of the motor control device 1 giving a command and the switching devices 743, 744 respectively performing a switching operation. The DC power obtained by boosting the high-voltage battery 5 is thereby generated and supplied to the inverter 3. The inverter 3 is operated based on the gate signal output from the motor control device 1, and power conversion from the DC power, which was boosted by the boost converter 74, to the AC power is performed.

In this embodiment, since the DC voltage is boosted by the boost converter 74, the modulation factor operating unit 163 in the motor control device 1 operates a post-boost modulation factor H' based on a d-axis voltage command Vd* and a q-axis voltage command Vq*, and a post-boost DC voltage Hvdc', according to Formula (10) below.

$$H' = \sqrt{(Vd^{*2} + Vq^{*2})/(Hvdc'/2)} \qquad (10)$$

In this embodiment, by the voltage phase error operating unit 164 referring to the electromagnetic excitation force reduction phase difference table 1644a and the torque pulsation reduction phase difference table 1644b based on the rotation speed ωr, the torque command T*, and the post-boost modulation factor H', the phase difference suitable for reducing the electromagnetic excitation force and the phase difference suitable for reducing the torque pulsation are respectively identified.

Fourth Embodiment

The fourth embodiment of the present invention is now explained. This embodiment explains an example of applying the present invention to an electric power steering system.

Figure 14:
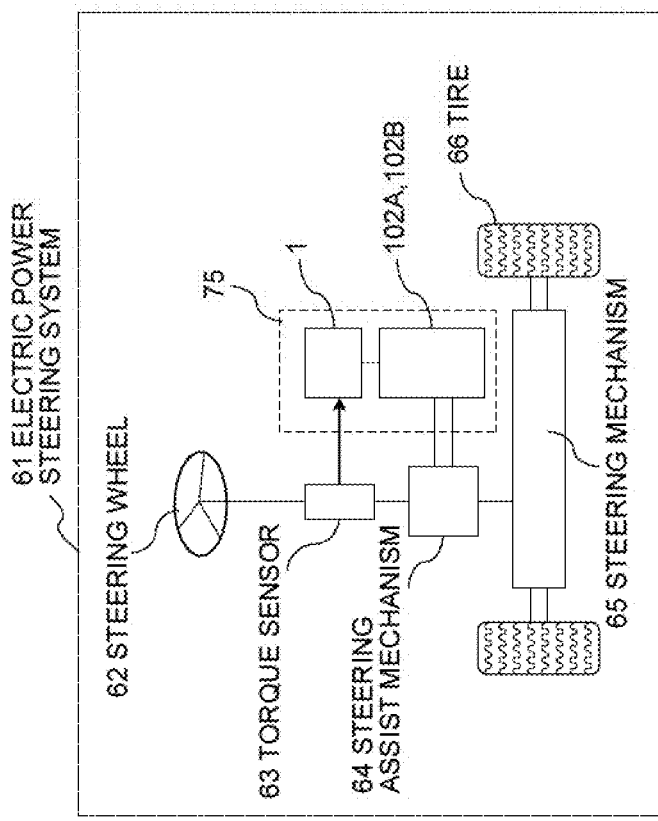
FIG. 14 is a diagram showing a configuration of the electric power steering system according to the fourth embodiment of the present invention.

FIG. 14 is a diagram showing a configuration of the electric power steering system according to the fourth embodiment of the present invention. The electric power steering system 61 has a drive control system 75 including the motor control device 1 explained in the first embodiment and redundant drive systems 102A, 102B. The electric power steering system 61 detects a rotational torque of the steering wheel 62 using the torque sensor 63, and operates the drive control system 75 based on the rotational torque. The steering force is thereby assisted as a result of an assist torque according to the input of the steering wheel 62 being generated and output to the steering mechanism 65 via the steering assist mechanism 64. Consequently, tires 66 are steered by the steering mechanism 65 and the advancing control of the vehicle is thereby controlled.

Generally speaking, since an electric power steering system of a vehicle is directly connected to a driver via a steering wheel, vibration and noise are easily propagated to the driver, and the requirement specification against vibration and noise is high. In particular, in a state where the driver is rotating the steering wheel at a high speed, the operation of the motor becomes dominant as the cause of vibration and noise in comparison to other generation factors. Meanwhile, since the electric power steering system 61 of this embodiment can effectively reduce the vibration in a state where the driver is rotating the steering wheel 62 at a high speed, a low-vibration and low-noise electric power steering system can be realized.

Figure 15:
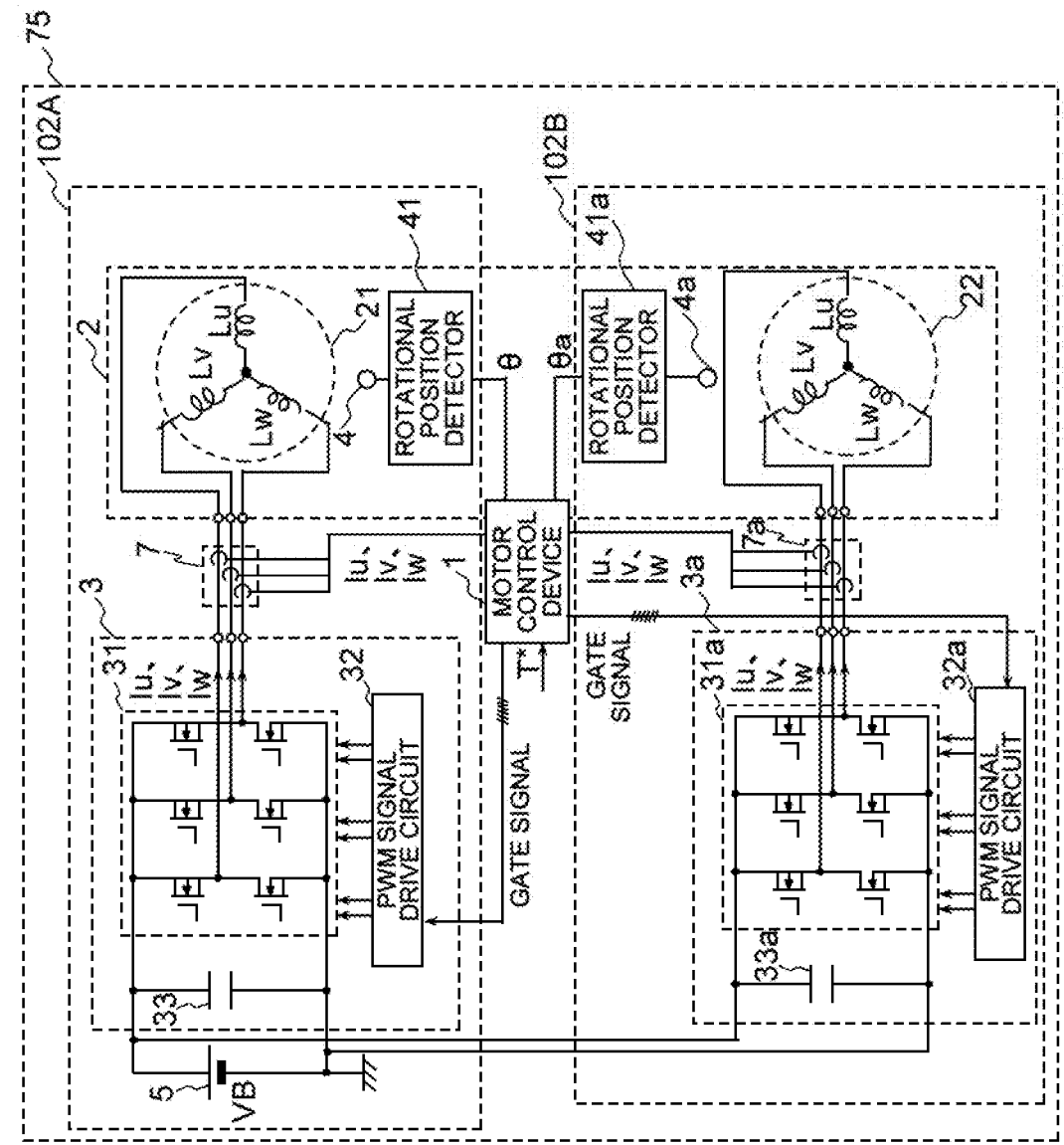
FIG. 15 is a diagram showing a configuration of the drive control system in the electric power steering system according to the fourth embodiment of the present invention.

FIG. 15 is a diagram showing a configuration of the drive control system 75 in the electric power steering system 61 according to the fourth embodiment of the present invention. In the drive control system 75, the motor control device 1, the motor 2 and the high-voltage battery 5 are commonly connected to the redundant drive systems 102A, 102B. In this embodiment, the motor 2 has two winding systems 21, 22, and one winding system 21 configures the drive system 102A and the other winding system 22 configures the drive system 102B.

The drive system 102A includes the inverter 3 and the rotational position detector 41, and the rotational position sensor 4 for detecting a rotational position θ of the rotor corresponding to the winding system 21 is mounted on the motor 2. The AC power generated by the inverter 3 flows to the winding system 21 of the motor 2 and rotatably drives the motor 2. In the drive system 102A, the current detection means 7 is disposed between the inverter 3 and the motor 2.

The drive system 102B includes an inverter 3a and a rotational position detector 41a, and a rotational position sensor 4a for detecting a rotational position θa of the rotor corresponding to the winding system 22 is mounted on the motor 2. The AC power generated by the inverter 3a flows to the winding system 22 of the motor 2 and rotatably drives the motor 2. In the drive system 102B, the current detection means 7a is disposed between the inverter 3a and the motor 2. Note that the inverter 3a, the rotational position detector 41a, the rotational position sensor 4a and the current detection means 7a are the same as those of FIG. 12 explained in the second embodiment.

A torque command T* to the motor 2 is input to the motor control device 1. The motor control device 1 generates a gate signal for controlling the drive of the motor 2 based on the input torque command T* according to the method explained in the first embodiment, and outputs the generated gate signal to the inverters 3, 3a, respectively. In other words, the voltage phase error operating unit 164 is used to operate the voltage phase error and adjust the frequency of the carrier wave so that the vibration and noise generated by the respective drive systems 102A, 102B can be suppressed. Note that the electromagnetic excitation force reduction phase difference table 1644a and the torque pulsation reduction phase difference table 1644b referenced in the foregoing operation may be, for example, values capable of most effectively reducing the electromagnetic excitation force or the torque pulsation in the respective drive systems 102A, 102B. Otherwise, while they may not be values capable of most effectively reducing the electromagnetic excitation force or the torque pulsation independently, they may be values capable of most effectively reducing the electromagnetic excitation force or the torque pulsation when totaling the pulsations of the drive systems 102A, 102B.

Note that the embodiments and various examples explained above are merely examples, and the present invention is not limited to the subject matter explained herein so as long as the features of the present invention are not impaired. Moreover, while various embodiments and modified examples were explained above, the present invention is not limited to the subject matter of such embodiments and examples. Other modes considered to fall within the technical scope of the present invention are also included in the scope of the present invention.

REFERENCE SIGNS LIST

1 . . . motor control device, 2, 2a . . . permanent magnet synchronous motor (motor), 3, 3a . . . inverter, 4, 4a . . . rotational position sensor, 5 . . . high-voltage battery, 7, 7a . . . current detection means, 11 . . . current command generation unit, 12 . . . speed calculation unit, 13 . . . three-phase/dq conversion current control unit, 14 . . . current control unit, 15 . . . dq/three-phase voltage command conversion unit, 16 . . . carrier frequency adjustment unit, 17 . . . triangular wave generation unit, 18 . . . gate signal generation unit, 31, 31a . . . inverter circuit, 32, 32a PWM signal drive circuit, 33, 33a . . . smoothing capacitor, 41, 41a . . . rotational position detector, 61 . . . electric power steering system, 72 . . . series hybrid system, 73 . . . boost converter system, 74 . . . boost converter, 75 . . . drive control system, 100 . . . motor drive system, 102A, 102B . . . drive system, 161 . . . synchronous PWM carrier wave count selection unit, 162 . . . voltage phase operating unit, 163 . . . modulation factor operating unit, 164 . . . voltage phase error operating unit, 165 . . . synchronous carrier frequency operating unit, 166 . . . carrier frequency setting unit, 721 . . . engine system, 722 . . . control means, 1641 . . . reference voltage phase operating unit, 1642 . . . pulsation frequency conversion unit, 1643 . . . pulsation contribution selection unit, 1644a . . . electromagnetic excitation force reduction phase difference table, 1644b . . . torque pulsation reduction phase difference table, 1645 . . . voltage phase difference conversion unit, 1646 . . . addition unit, 1647 . . . subtraction unit

The invention claimed is:

1. A motor control device which controls a drive of an AC motor that is connected to a power converter which converts power from DC power to AC power, and driven with the AC power, comprising:
a carrier wave generation unit which generates a carrier wave;
a carrier frequency adjustment unit which adjusts a frequency of the carrier wave; and
a gate signal generation unit which performs pulse-width modulation on a voltage command according to a torque command using the carrier wave, thereby generating a gate signal for controlling an operation of the power converter,
wherein the carrier frequency adjustment unit adjusts the frequency of the carrier wave so as to change a phase difference of the voltage command and the carrier wave based on the torque command and a rotation speed of the AC motor.

2. The motor control device according to claim 1,
wherein the carrier frequency adjustment unit adjusts the frequency of the carrier wave so that the frequency of the carrier wave becomes an integral multiple of a frequency of the voltage command.

3. The motor control device according to claim 1,
wherein the carrier frequency adjustment unit selects one of either a torque pulsation generated in a circumferential direction of the AC motor or an electromagnetic excitation force generated in a radial direction of the AC motor based on the rotation speed of the AC motor, and changes the phase difference so as to reduce the selected torque pulsation or electromagnetic excitation force.

4. The motor control device according to claim 1,
wherein the carrier frequency adjustment unit changes the phase difference based on the torque command, the rotation speed, and a voltage amplitude ratio of the DC power and the AC power.

5. The motor control device according to claim 1,
wherein the carrier frequency adjustment unit changes the phase difference based on each harmonic component having a multiple of six as its order among harmonic components of a fundamental current according to the voltage command.

6. The motor control device according to claim 1,
wherein the carrier frequency adjustment unit determines whether the AC motor is in a state of either a power running drive or a regenerative drive based on the torque command, and changes the phase difference based on a result of the determination.

7. A motor control method for controlling a drive of an AC motor that is connected to a power converter which converts power from DC power to AC power, and driven with the AC power, comprising:
adjusting a frequency of a carrier wave so as to change a phase difference of a voltage command according to a torque command and the carrier wave based on the torque command to the AC motor and a rotation speed of the AC motor;
generating the carrier wave at the adjusted frequency; and
performing pulse-width modulation on the voltage command using the carrier wave, thereby generating a gate signal for controlling an operation of the power converter.

8. The motor control method according to claim 7,
adjusting the frequency of the carrier wave so that the frequency of the carrier wave becomes an integral multiple of a frequency of the voltage command.

9. The motor control method according to claim 7,
selecting one of either a torque pulsation generated in a circumferential direction of the AC motor or an electromagnetic excitation force generated in a radial direction of the AC motor based on the rotation speed of the AC motor, and changing the phase difference so as to reduce the selected torque pulsation or electromagnetic excitation force.

10. The motor control method according to claim 7,
changing the phase difference based on the torque command, the rotation speed, and a voltage amplitude ratio of the DC power and the AC power.

11. The motor control method according to claim 7,
changing the phase difference based on each harmonic component having a multiple of six as its order among harmonic components of a fundamental current according to the voltage command.

12. The motor control method according to claim 7,
determining whether the AC motor is in a state of either a power running drive or a regenerative drive based on the torque command, and changing the phase difference based on a result of the determination.

13. A hybrid system, comprising:
the motor control device according to claim 1;
a power converter which is operated based on the gate signal output from the motor control device, and which converts power from DC power to AC power;
an AC motor which is driven with the AC power; and
an engine system which is connected to the AC motor.

14. A boost converter system, comprising:
the motor control device according to claim 1;
a boost converter which is connected to a DC power source and generates DC power obtained by boosting the DC power source according to a control of the motor control device; and
a power converter which is operated based on the gate signal output from the motor control device, and which performs power conversion from the DC power boosted with the boost converter to AC power.

15. An electric power steering system, comprising:
the motor control device according to claim 1;
a plurality of power converters which are respectively operated based on the gate signal output from the motor control device, and which respectively perform power conversion from DC power to AC power; and
an AC motor which includes a plurality of winding systems, and which is driven by the AC power generated by each of the plurality of power converters flowing to each of the plurality of winding systems,
wherein the electric power steering system controls steering of a vehicle using the AC motor.

* * * * *